United States Patent [19]
Ando

[11] Patent Number: 5,931,951
[45] Date of Patent: Aug. 3, 1999

[54] COMPUTER SYSTEM FOR PREVENTING CACHE MALFUNCTION BY INVALIDATING THE CACHE DURING A PERIOD OF SWITCHING TO NORMAL OPERATION MODE FROM POWER SAVING MODE

[75] Inventor: Motoaki Ando, Tokyo, Japan

[73] Assignee: Kabushiki Kaisha Toshiba, Kawasaki-shi, Japan

[21] Appl. No.: 08/917,599

[22] Filed: Aug. 26, 1997

[30] Foreign Application Priority Data

Aug. 30, 1996 [JP] Japan ..................................... 8-230155

[51] Int. Cl.⁶ ....................................................... G06F 1/32
[52] U.S. Cl. ......................... 713/324; 713/322; 713/400; 711/141
[58] Field of Search .......................... 395/750.01–750.08, 395/551; 711/141; 713/300, 310, 320, 323, 324, 330, 340, 400

[56] References Cited

U.S. PATENT DOCUMENTS 5,486,726  1/1996  Kim et al. ............................... 307/120
5,630,146  5/1997  Conary et al. ...................... 395/750.04
5,724,611  3/1998  Evoy ........................................ 395/848
5,813,022  9/1998  Ramsey et al. .............................. 711/3

FOREIGN PATENT DOCUMENTS 5-2872  1/1993  Japan ............................ G11C 11/401

*Primary Examiner*—Thomas C. Lee
*Assistant Examiner*—Harold Kim
*Attorney, Agent, or Firm*—Finnegan, Henderson, Farabow, Garrett & Dunner, L.L.P.

[57] ABSTRACT

When a CPU enters the sleep mode, an L2 cache with the ZZ terminal is also switched to the sleep mode simultaneously. When the CPU returns from the sleep mode, the L2 cache is simultaneously switched from the sleep mode to the normal operation mode. Since the normal operation of the cache is not ensured for a fixed period of time from when it leaves the sleep mode, the cache is placed in the disabled state in which its use is prohibited before being switched to the sleep mode and returned to the enabled state in which its use is allowed after a lapse of a fixed period of time from when it leaves the sleep mode.

15 Claims, 19 Drawing Sheets

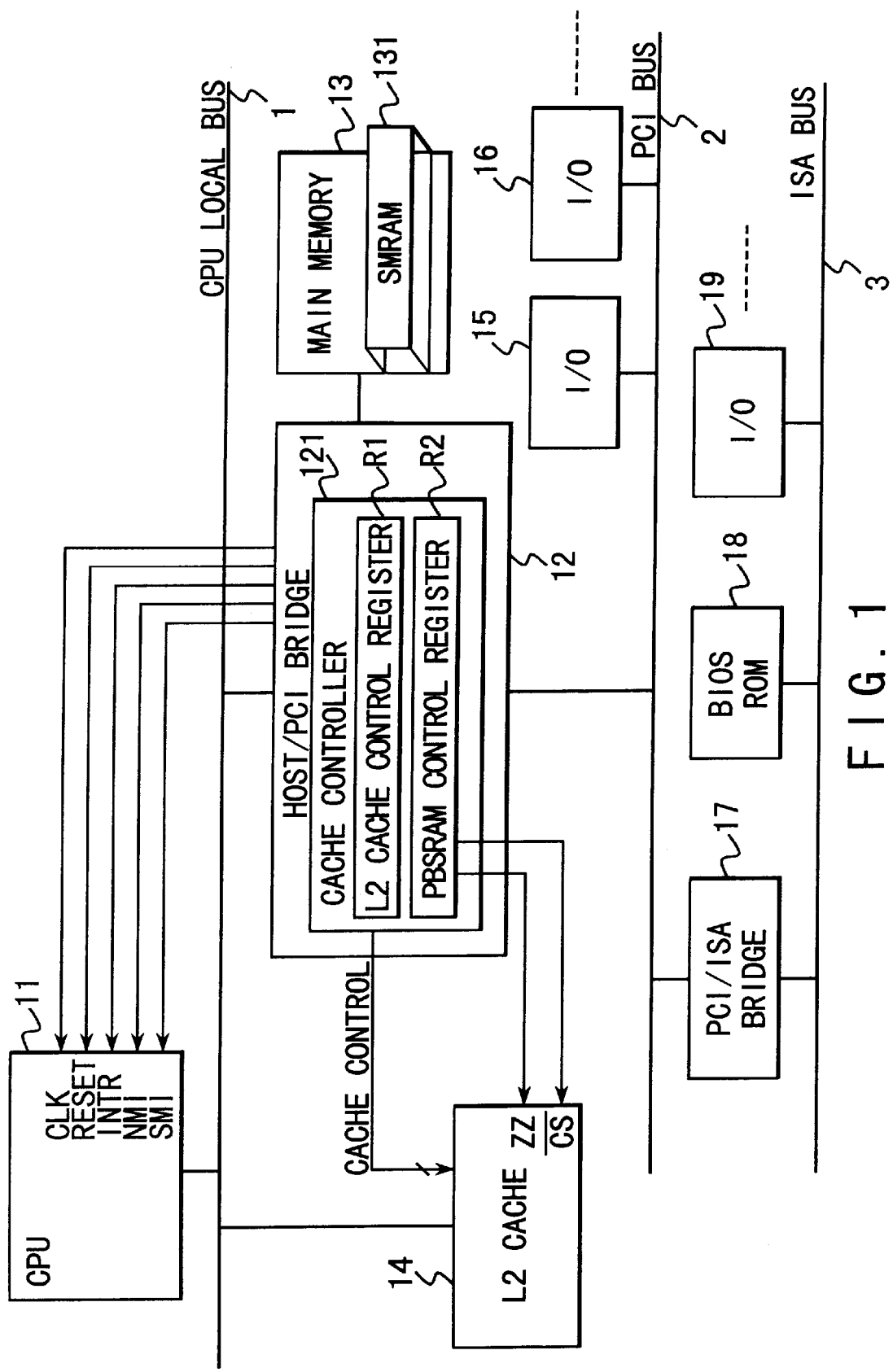
F I G. 1

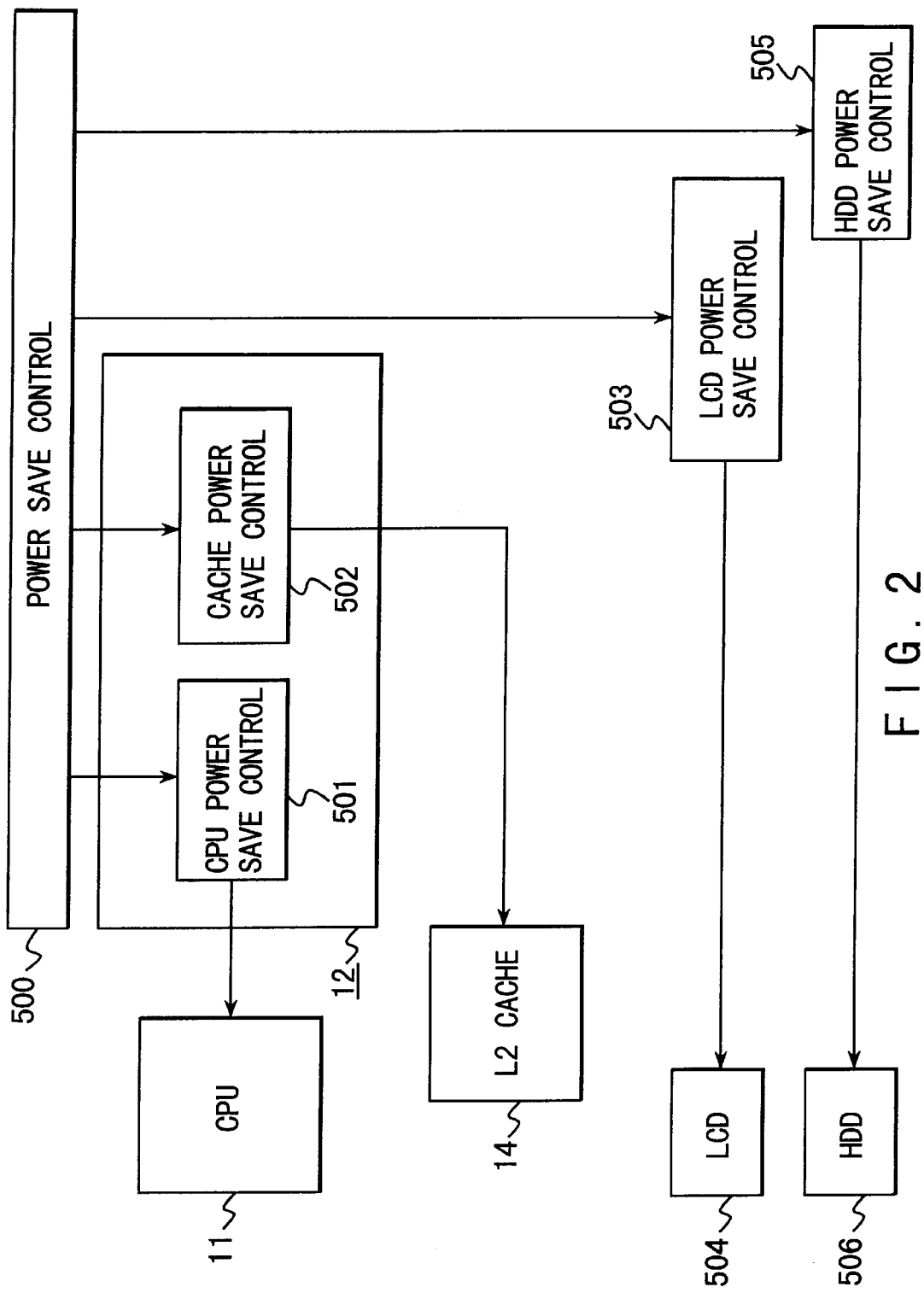
F I G. 2

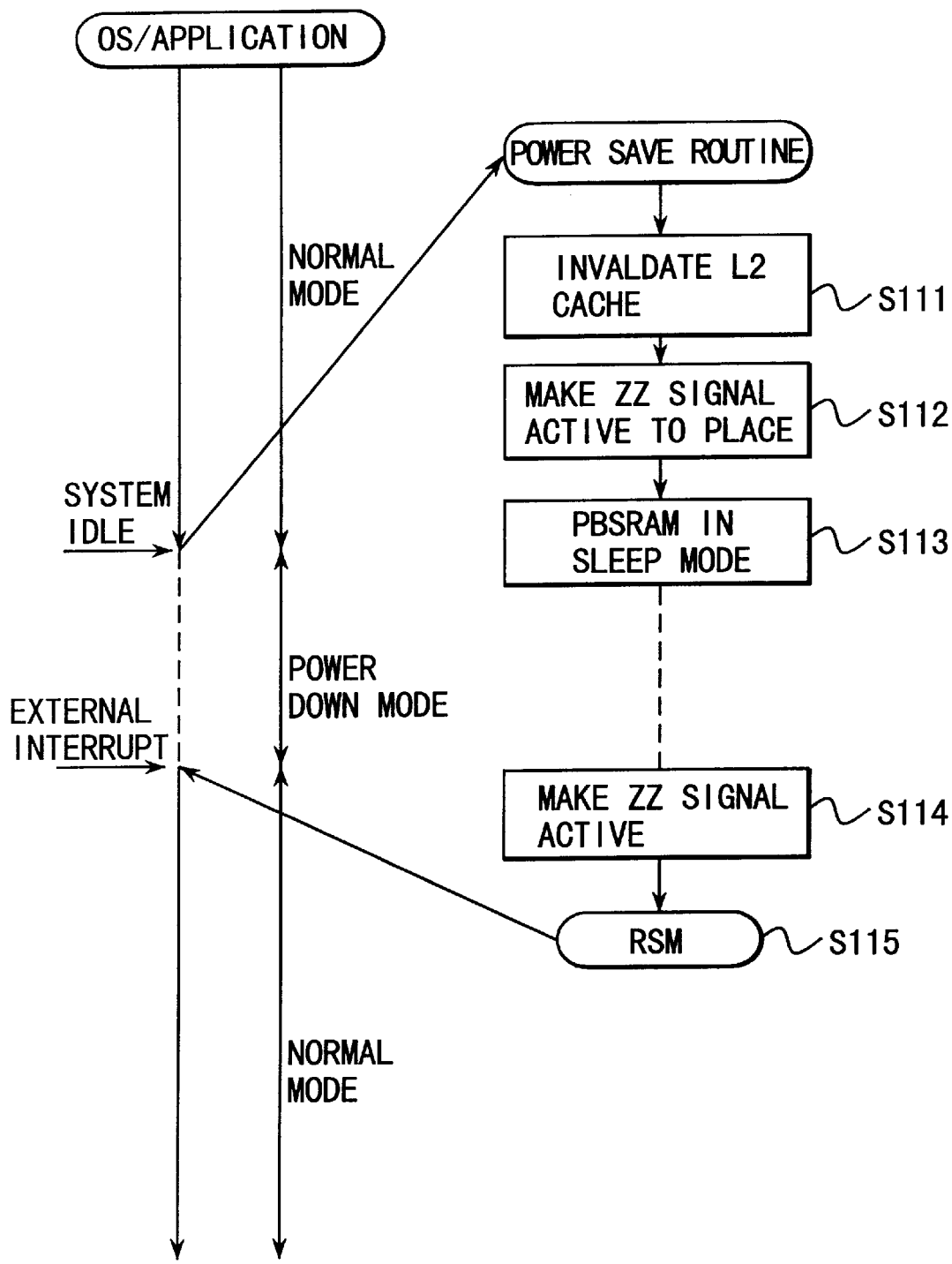
F I G. 7

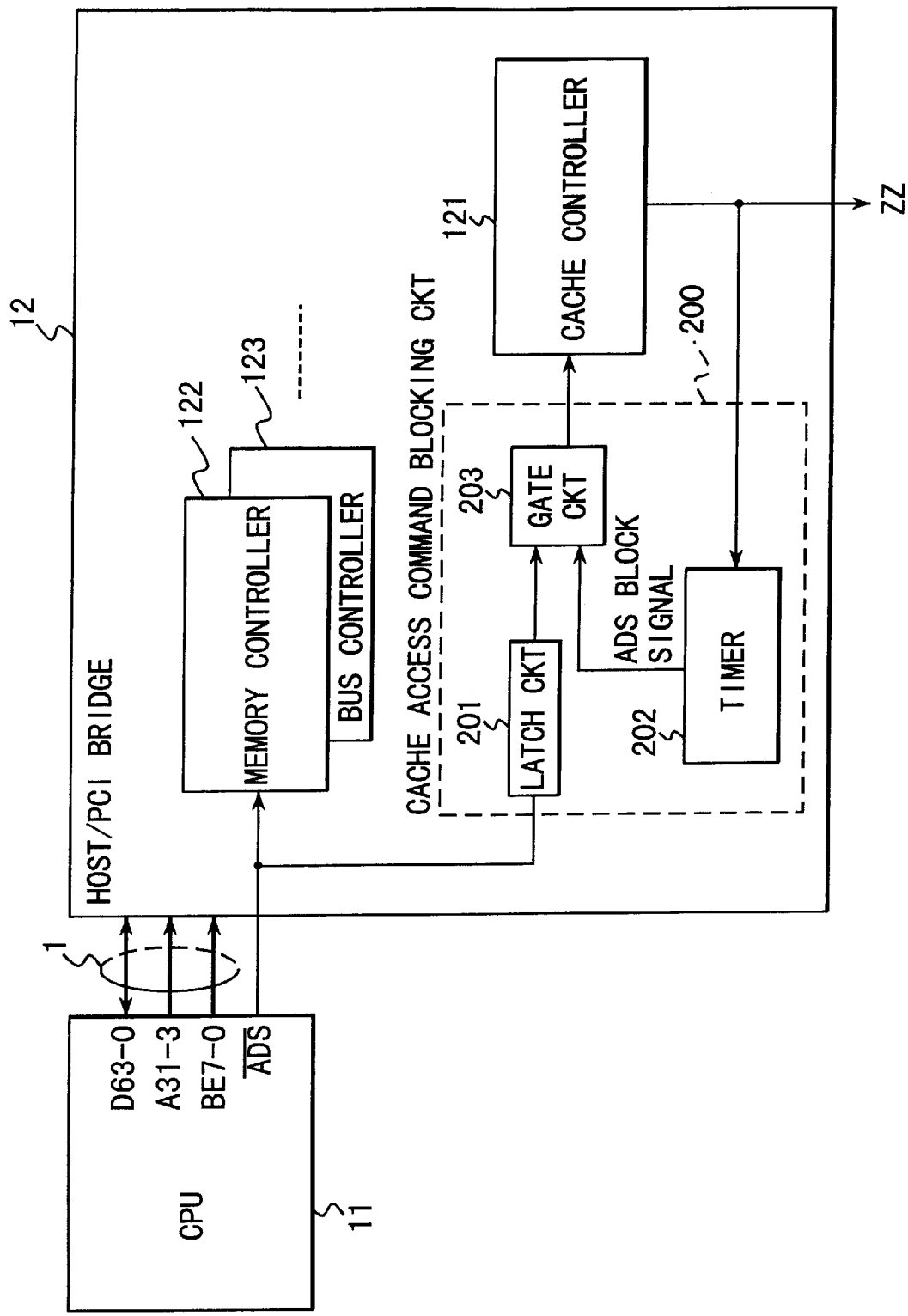
F I G. 8

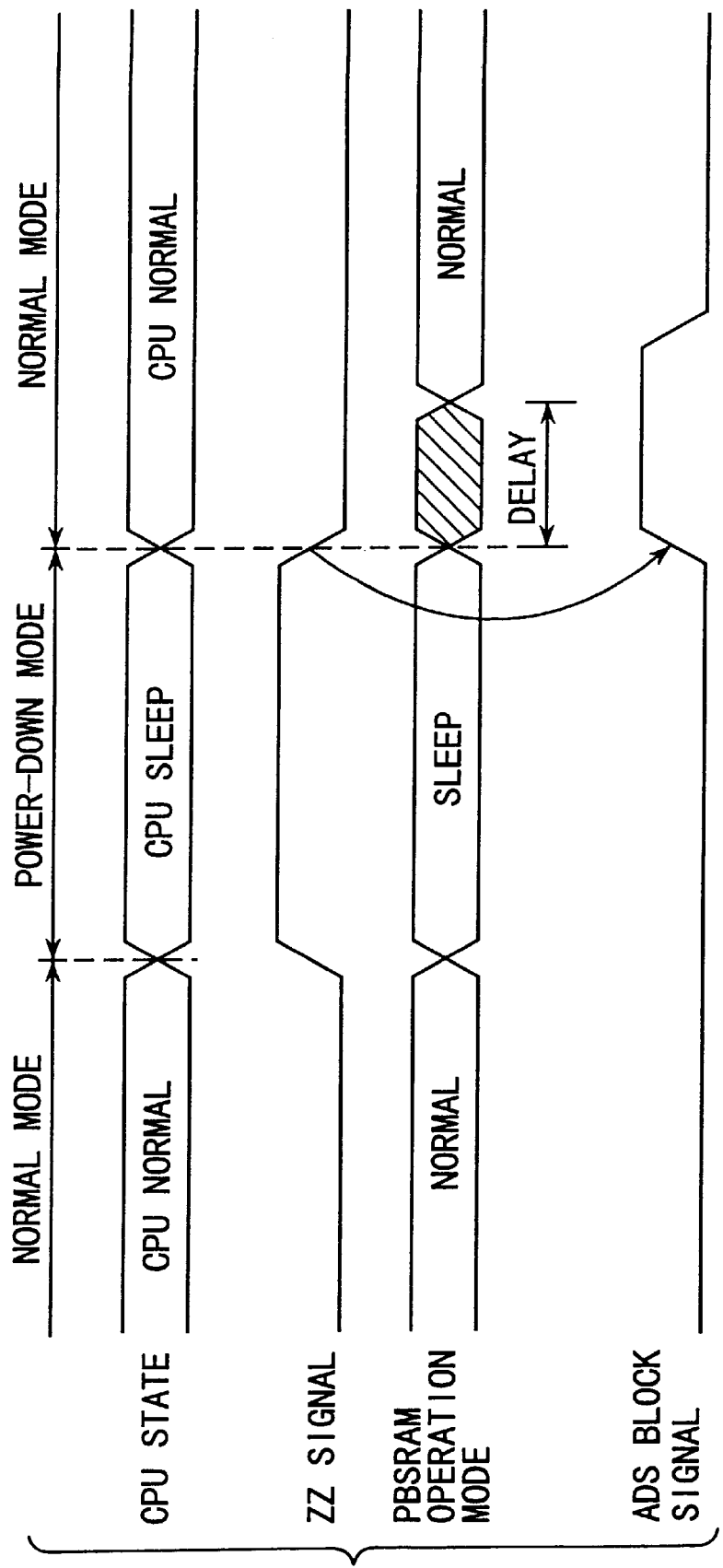
F I G. 9

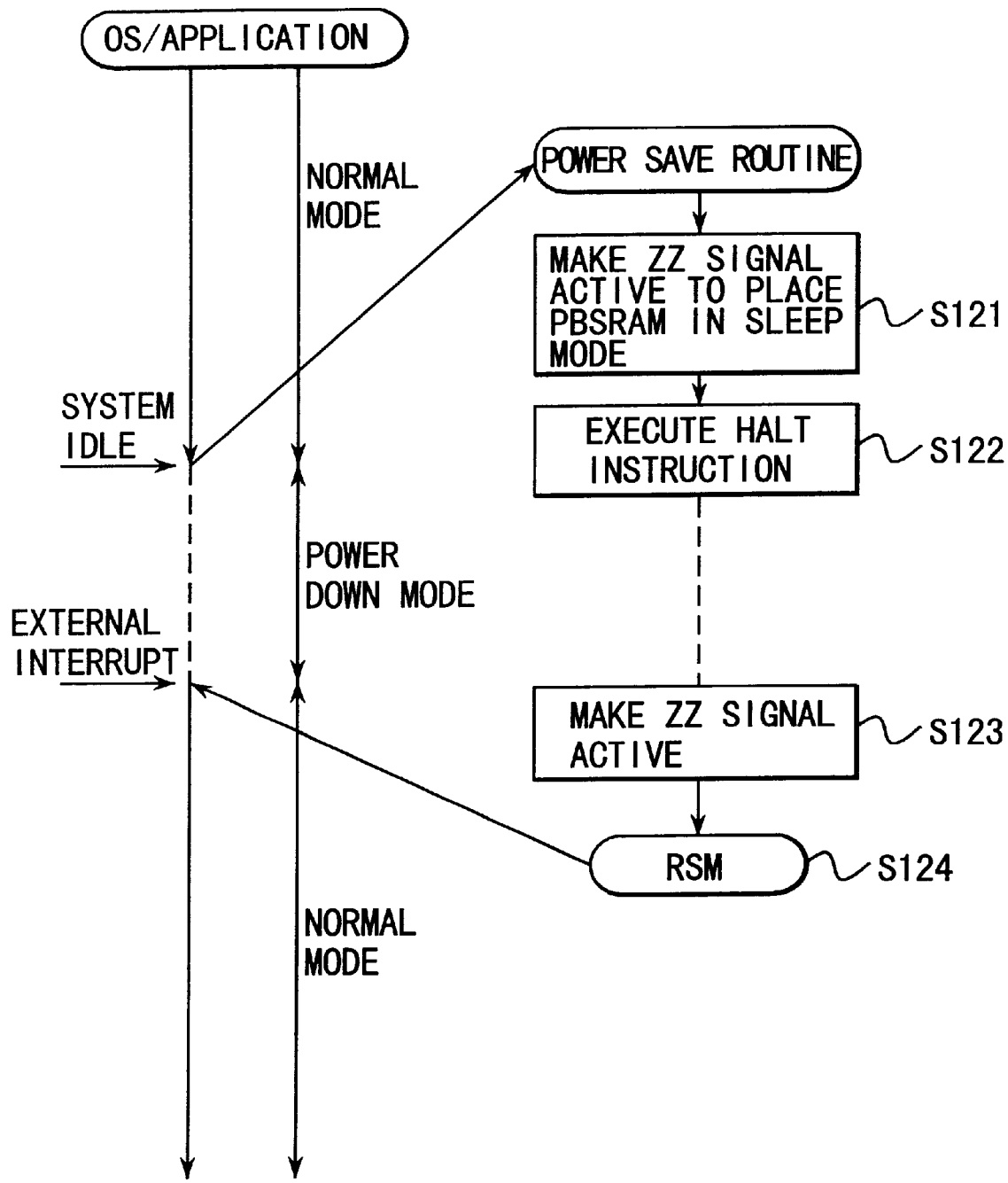
F I G. 10

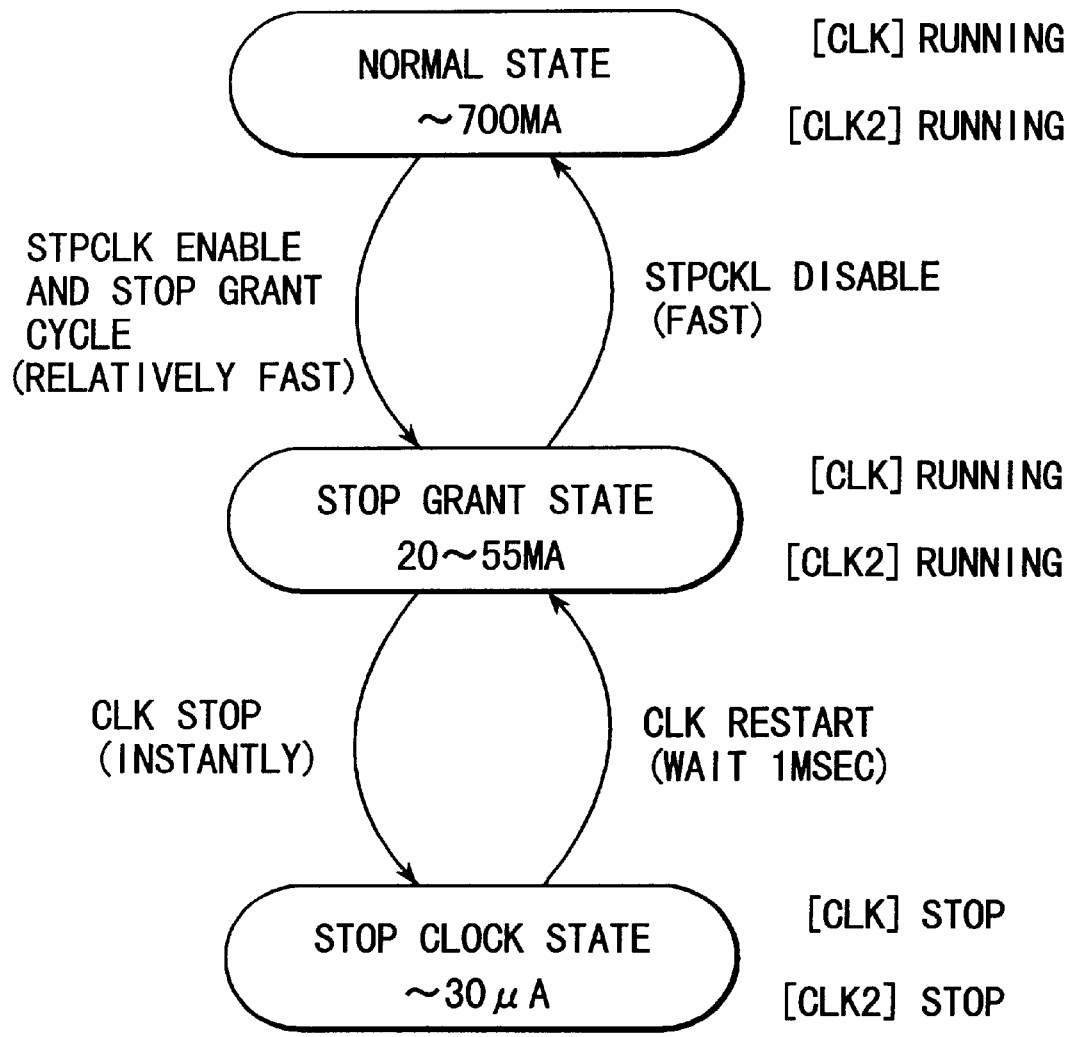
F I G. 12

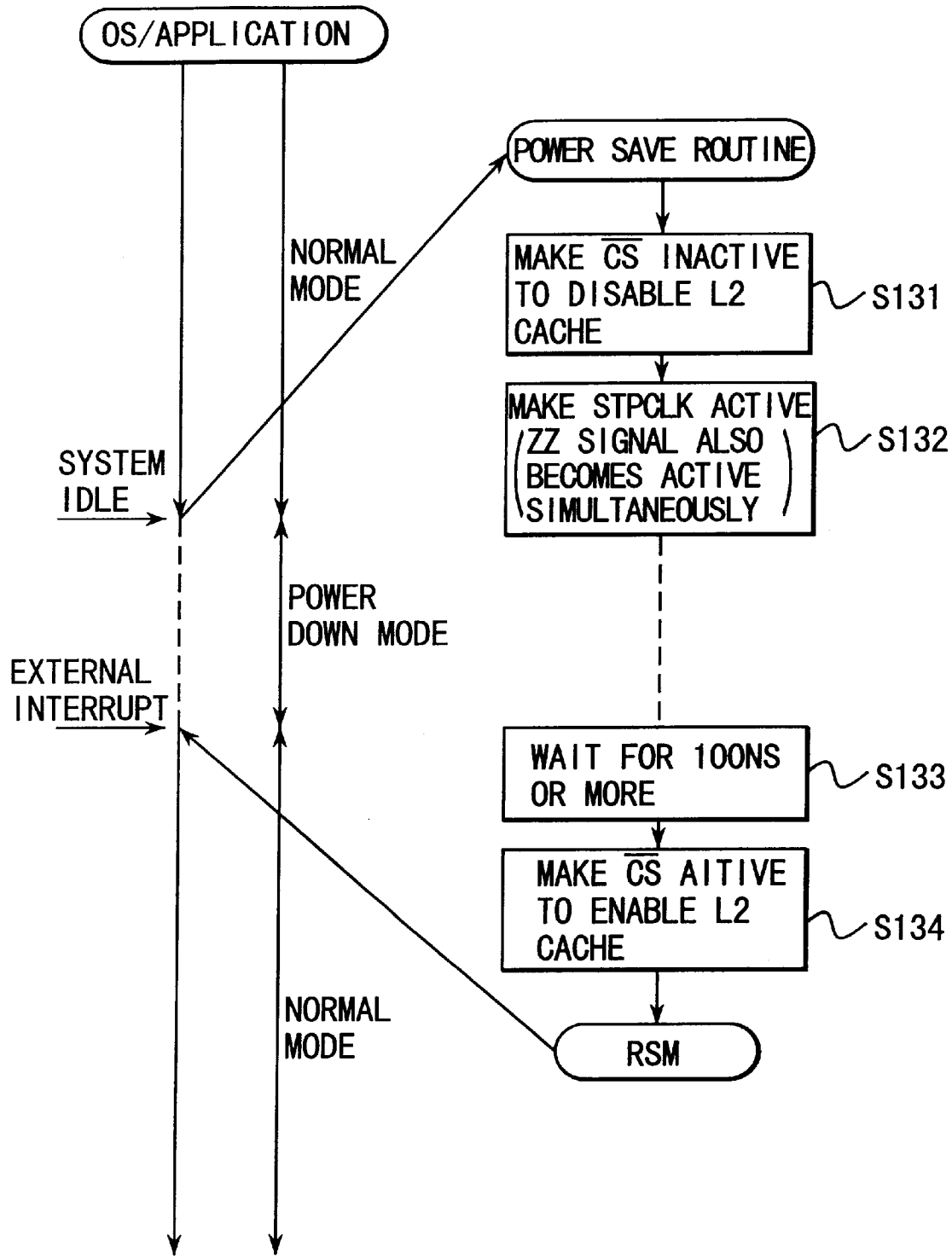
F I G. 14

FIG. 19

DC CHARACTERISTICS (Ta=0~70°C, $V_{DD}$=$V_{DDQ}$=3.1V~3.6V)

| SIGN | ITEM | CONDITIONS | MIN. | TYP. | MAX. | UNIT |
|---|---|---|---|---|---|---|
| $I_{DDO2}$ | ACTIVE CONSUMPTION CURRENT (IDLE STATE) | CHIP ENABLED, $I_{OUT}$=0mA $\overline{ADCS}$, ADSP, $\overline{ADV}$ ≥ $V_{IH}$ ALL INPUTS=$V_{IH}$/$V_{IL}$, CLK≥$t_{KC}$ MIN. -7 | – | – | 210 | mA |
| | | -8, -10, -12 | – | – | 190 | |
| $I_{DDS1}$ | STATIC CONSUMPTION CURRENT (CLOCKED STATE) | CHIP DISABLED, ALL INPUTS=$V_{IH}$/$V_{IL}$ CLK≥$t_{KC}$ min. -7 | – | – | 45 | mA |
| | | -8, -10, -12 | – | – | 35 | |

COMPUTER SYSTEM FOR PREVENTING CACHE MALFUNCTION BY INVALIDATING THE CACHE DURING A PERIOD OF SWITCHING TO NORMAL OPERATION MODE FROM POWER SAVING MODE

BACKGROUND OF THE INVENTION

The present invention relates to a computer system which has a power save mode for reducing power dissipation suitable for, for instance, a laptop or notebook personal computer and a method of controlling power saving in a cache memory used with the computer system.

In recent years, various notebook computers which are easy to carry and can run on batteries have been developed. To reduce wasteful power dissipation, computers of this type have various power saving functions built in.

Typical power saving functions include CPU sleep mode functions of automatically stopping the CPU at the time the system is idle, suspend functions of not only stopping the CPU but turning off power to substantially all devices except the system memory of the computer system, and functions of stopping the hard disk driving motor or turning off the display under predetermined conditions.

Recently, for improved system performance, many desk-top computers have begun to adopt a secondary cache consisting of a fast SRAM or the like. With a system having a secondary cache built in, the CPU wait time due to a relatively long memory cycle for access to the main storage is saved, permitting the CPU performance to be displayed fully. As a type of fast SRAM suitable for use as the secondary cache, a pipeline burst SRAM (PBSRAM) is known. With the PBSRAM, the burst transfer cycle between the CPU and the secondary cache can be made considerably faster than with the normal asynchronous fast SRAM.

However, the conventional suspend and CPU sleep functions are not provided with means for attaining power saving of the secondary cache. For this reason, the incorporation of a secondary cache into a notebook personal computer requiring low power dissipation improves the operating speed but reduces the time the computer can operate on a battery. In the suspend mode, not only the system memory but also the secondary cache requires battery voltage to hold stored data. Thus, the time that data can be held is also reduced, which significantly affects a fast SRAM, such as a PBSRAM in particular, because it has large power dissipation.

PBSRAMs which have been developed recently include ones of a type with a low power dissipation mode (for instance, the Toshiba TC55V1325). This type of PBSRAM has a power-down input terminal referred to as a ZZ pin. When a power-down signal applied to the input terminal becomes active, the mode of operation is switched from the normal operation mode to the low power dissipation mode. In the low power dissipation mode, all input signals including a clock signal are blocked. The current dissipation can be suppressed to as much as 2 mA even with a clock applied. Data is held during the low power dissipation mode. When the power-down signal goes inactive, the operation mode is switched from the low power dissipation mode back to the normal operation mode. Even if the switching is made to the normal operation mode, the PBSRAM cannot operate immediately: it is necessary to wait about 100 ns from when the operation mode is switched until the normal operation is ensured.

In using a PBSRAM having the ZZ pin as a secondary cache, therefore, it is required to make the secondary cache unavailable for a fixed period after the operation mode is switched back to the normal operation mode. This is intended to prevent malfunctions due to access to the secondary cache made by the CPU during an interval in which the normal operation of the PBSRAM is not ensured.

While the CPU is operating in the normal mode, not the above-mentioned sleep mode or suspend mode, no measures are taken to save power in the secondary cache memory. It is desired that some measures be taken to save power in the secondary cache memory while the CPU is operating in the normal mode, not only in a desk-top personal computer but also in a portable personal computer in which power should be saved as much as possible.

BRIEF SUMMARY OF THE INVENTION

It is an object of the invention to provide a computer system which provides high performance, low power dissipation and high reliability by implementing an effective power saving function utilizing the lower power dissipation mode of a secondary cache and a power saving control method for the computer system.

A computer system according to claim 1 is directed to a computer system which has a normal operation mode and a power saving mode that is lower in power dissipation than the normal operation mode and has functions of making a transition from the normal operation mode to the power saving mode and making a return from the power saving mode to the normal operation mode, comprising: a cache memory having its operation mode switched between a normal operation mode and a low power dissipation mode; means for switching the operation mode of the cache memory from the normal operation mode to the low power dissipation mode; means for switching the operation mode of the cache memory from the low power dissipation mode to the normal operation mode; and malfunction preventing means for preventing malfunctions resulting from the cache memory being accessed before the normal operation of the cache memory is ensured.

In this computer system, a cache memory having a power-down input terminal such as a ZZ terminal is used. A power-down signal to the power-down input terminal enables a saving of power in the cache memory. That is, when the computer system makes a transition from the normal mode to the power save mode that involves stopping the CPU operations, such as suspend mode, CPU sleep mode, or the like, the cache memory is also switched from the normal operation mode to the low power dissipation mode synchronously with that CPU's transition. When the computer system returns from the suspend mode or sleep mode, the cache memory is also switched from the low power dissipation mode to the normal operation mode. By switching the operation mode of the cache memory synchronously with the switching of the operation mode of the computer system in that manner, the cache memory can be set to the low power dissipation mode in such a way as to coincide in time with the CPU sleep interval. Thus, power saving in the cache memory and the whole computer system is enabled without affecting the system performance.

With this computer system, control is performed such that the cache memory is set to the disabled state in which access is prohibited before it is switched to the low power dissipation mode and then returned to the enabled state in which access is allowed after a lapse of a predetermined period of time from when it is switched to the normal operation mode. Even if the cache memory is switched to the normal operation mode, therefore, it can be kept unavailable for a fixed period of time from the time of mode switching. This allows the prevention of occurrence of malfunctions resulting from cache access because the cache is unavailable before its return to the normal operating state, i.e., even if access to the cache is made by the CPU immediately after switching to the normal operation mode.

The enable/disable control of the cache memory can be implemented by setting a chip enable signal to the cache memory active/inactive.

In a computer system of claim 4, the malfunction preventing means in claim 1 comprises cache invalidate means for invalidating a contents of the cache memory when the cache memory is switched to the low power dissipation mode so that a cache miss takes place in cache access made during the predetermined period of time.

In this computer system, the cache memory has already become invalidated when it is switched from the low power dissipation mode to the normal operation mode. For this reason, the first access to the cache made after the cache memory has been switched to the normal operation mode is always a cache miss. In the event of a cache miss, no reading from or writing into the cache memory is performed and a memory cycle for access to the main memory is carried out. This memory cycle requires a relatively long time. No access to the cache occurs until the termination of the memory cycle. Thus, the cache memory can return to the normal operating state during that time, allowing the next access to the cache to be made to read from or write into the cache memory normally. Therefore, even if access to the cache is made immediately after the cache memory has been switched to the normal operation mode, a malfunction due to that access can be prevented.

In a computer system of claim 5, the malfunction preventing means of claim 1 includes block means for blocking an entry of a memory access command from a CPU to a cache controller until the predetermined period of time elapses from when the state of the power-down signal is changed to switch the operation mode of the cache memory from the low power dissipation mode to the normal operation mode.

In this computer system, blocking of command inputs is initiated by the block means at the same time the operation mode of the cache memory is switched by the power-down signal from the low power dissipation mode to the normal operation mode. Thus, malfunctions resulting from cache access made during a time interval required before the cache memory is restored to normal operation can be prevented by simply performing switching control of the operation mode of the cache memory using the power-down signal in conjunction with the computer system.

A computer system of claim 6 is directed to a computer system comprising: a CPU having a stop clock input terminal connected to receive a stop clock signal and responsive to the stop clock signal to switch its operation mode between a normal operation mode and a low power dissipation mode in which clock supply to its core unit is stopped; a cache memory having a power-down input terminal connected to receive a power-down signal and responsive to the power-down signal to switch its operation mode between a normal operation mode and a low power dissipation mode; and means for, at the time the system is in idle state, generating the stop clock signal to set the CPU to the low power dissipation mode and, at the time of occurrence of a system event, stopping the generation of the stop clock signal to return the CPU from the low power dissipation mode to the normal operation mode, the power-down input terminal of the cache memory being electrically coupled to the stop clock input terminal of the CPU to thereby allow the operation mode of the cache memory to be switched between the normal operation mode and the low power dissipation mode in conjunction with the operation mode switching in the CPU.

In this computer system, since the power-down input terminal of the cache memory and the stop clock input terminal of the CPU are electrically coupled to each other, the ganged control of CPU power down and cache power down is enabled without need of provision of any facility for controlling the generation of the power-down signal applied to the cache memory. This allows a computer system that is simple in configuration, has high performance and features low power dissipation to be implemented.

A cache memory control method of claim 12 is directed to a cache memory control method for a computer system having a CPU of which an operation is stopped at a time the system is in idle state, and is restarted at a time of occurrence of a system event, a cache memory having its operation mode switched between a normal operation mode and a low power dissipation mode ,a first register in which power-down control information is set for controlling a generation of the power-down signal, and a second register in which chip select control information is set for controlling a generation of a chip select signal to be applied to the cache memory, comprising the steps of: setting the cache memory from the enabled state to the disabled state by rewriting the chip select control information in the second register, upon detecting the system idle state; switching the operation mode of the cache memory to the low power dissipation mode by rewriting the power-down control information in the first register; stopping the operation of the CPU; switching the operation mode of the cache memory from the low power dissipation mode to the normal operation mode by rewriting the power-down control information in the first register when the operation of the CPU is started by the occurrence of the system event; and setting the cache memory from the disabled state to the enabled state by rewriting the chip select control information in the second register after a lapse of a predetermined period of time from the switching.

Equipped with a register for controlling the generation of the power-down signal and a register for controlling the generation of a chip select signal, the computer system can readily control the timing of each of the power-down signal and the chip select signal by software-based control without using any other special hardware. Therefore, the computer system enables ganged control of CPU power saving and cache power saving by simply adding a register control procedure to a conventional BIOS program that implements a power saving function involving stopping of the CPU. In addition, malfunctions resulting from cache access made during a time interval required before the cache memory becomes enabled can be prevented because the cache memory is disabled and subjected to power-down control before the operation of the CPU itself is stopped and, when the operation of the CPU is restarted, the cache memory is enabled after a lapse of a predetermined period of time from when it is restored to normal operation mode by register control.

A cache memory control method of claim 13 is directed to a cache memory control method for a computer system having a CPU of which an operation is stopped at a time the system is in idle state, and is restarted at a time of occurrence of a system event, a cache memory having its operation mode switched between a normal operation mode and a low power dissipation mode, a cache controller for controlling the cache memory, and a register in which power-down control information is set for controlling a generation of a power-down signal to be applied for the cache memory, comprising the steps of: executing invalidate cycle to invalidate the contents of the cache memory by the cache controller upon detecting the system idle state; switching the operation mode of the cache memory to the low power dissipation mode by rewriting the power-down control information in the register; stopping the operation of the CPU; and switching the operation mode of the cache memory from the low power dissipation mode to the normal operation mode by rewriting the power-down control information the register when the operation of the CPU is started by the occurrence of the system event.

In this arrangement, an invalidate cycle for the cache memory in place of the cache enable/disable control based on the chip select signal in the computer system is used. That is, an invalidate cycle is carried out for the cache memory before the operation of the CPU itself is stopped, thereby causing a cache miss at the restart of the CPU operation to prevent malfunctions resulting from cache access.

A cache memory control method of claim 14 is directed for a cache memory control method for computer system having a CPU of which an operation is stopped at a time the system is in idle state and is restarted at a time of occurrence of a system event a cache memory having its operation mode switched between a normal operation mode and a low power dissipation mode, a cache controller for controlling the cache memory, a register in which power-down control information is set for controlling a generation of a power-down signal applied to be the cache memory, and a block circuit responsive to the power-down signal for blocking the entry of a memory access command from the CPU to the cache controller, comprising the steps of: switching the operation mode of the cache memory to the low power dissipation mode by rewriting the power-down control information in the register upon detecting the system idle state; stopping the operation of the CPU; switching the operation mode of the cache memory from the low power dissipation mode to the normal operation mode by rewriting the power-down control information the register when the operation of the CPU is started by the occurrence of the system event; and blocking the entry of a memory access command from the CPU to the cache controller until a predetermined period of time elapses from when the state of the power-down signal is changed to switch the operation mode of the cache memory from the low power dissipation mode to the normal operation mode.

In this arrangement, instead of using the cache disable/enable control based on the chip select signal in the claim 12, a block circuit for blocking the entry of memory access commands from the CPU to the cache controller to thereby prevent malfunctions due to cache access is used.

Another object of the invention is to provide a computer system which consumes but little power when operated.

To attain this object, a computer system according to the invention comprises: a main memory; I/O devices; a CPU for outputting an M/IO signal which represents a first operation cycle while the CPU is accessing the main memory and a second operation cycle while the CPU is accessing I/O devices; and a cache memory which is operated in a normal power-consumption mode when the M/IO signal represents the first operation cycle and in a low power-consumption mode when the M/IO signal represents the second operation cycle.

In this computer system, power can be saved in the cache memory while the CPU is operating in the normal operation mode.

Additional objects and advantages of the present invention will be set forth in the description which follows, and in part will be obvious from the description, or may be learned by practice of the present invention.

The objects and advantages of the present invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the present invention and, together with the general description given above and the detailed description of the preferred embodiments given below, serve to explain the principles of the present invention in which:

FIG. 1 is a schematic block diagram of a computer system according to a first embodiment of the present invention;

FIG. 2 is a schematic block diagram of a power saving control arrangement in the computer system according to the first embodiment;

FIG. 7 is a flowchart for a BIOS power save routine for implementing the timing control shown in FIG. 6;

FIG. 8 is a block diagram of a cache access command block circuit used when a third power saving control method is applied to the computer system of the first embodiment;

FIG. 9 is a timing diagram illustrating a relationship between operating states of the CPU and the operation modes of the PBSRAM when the third power saving control method is applied to the computer system of the first embodiment;

FIG. 10 is a flowchart for a BIOS power save routine for implementing the timing control shown in FIG. 9;

FIG. 12 is a diagram for use in explanation of a stop clock signal used for CPU power saving in the computer system of the second embodiment;

FIG. 14 is a flowchart for a BIOS power saving routine for implementing a first power saving method applied to the computer system of the second embodiment;

FIG. 19 is a table which shows the DC characteristics of TC55V1325 of the third embodiment.

DETAILED DESCRIPTION OF THE INVENTION

Figure 3:
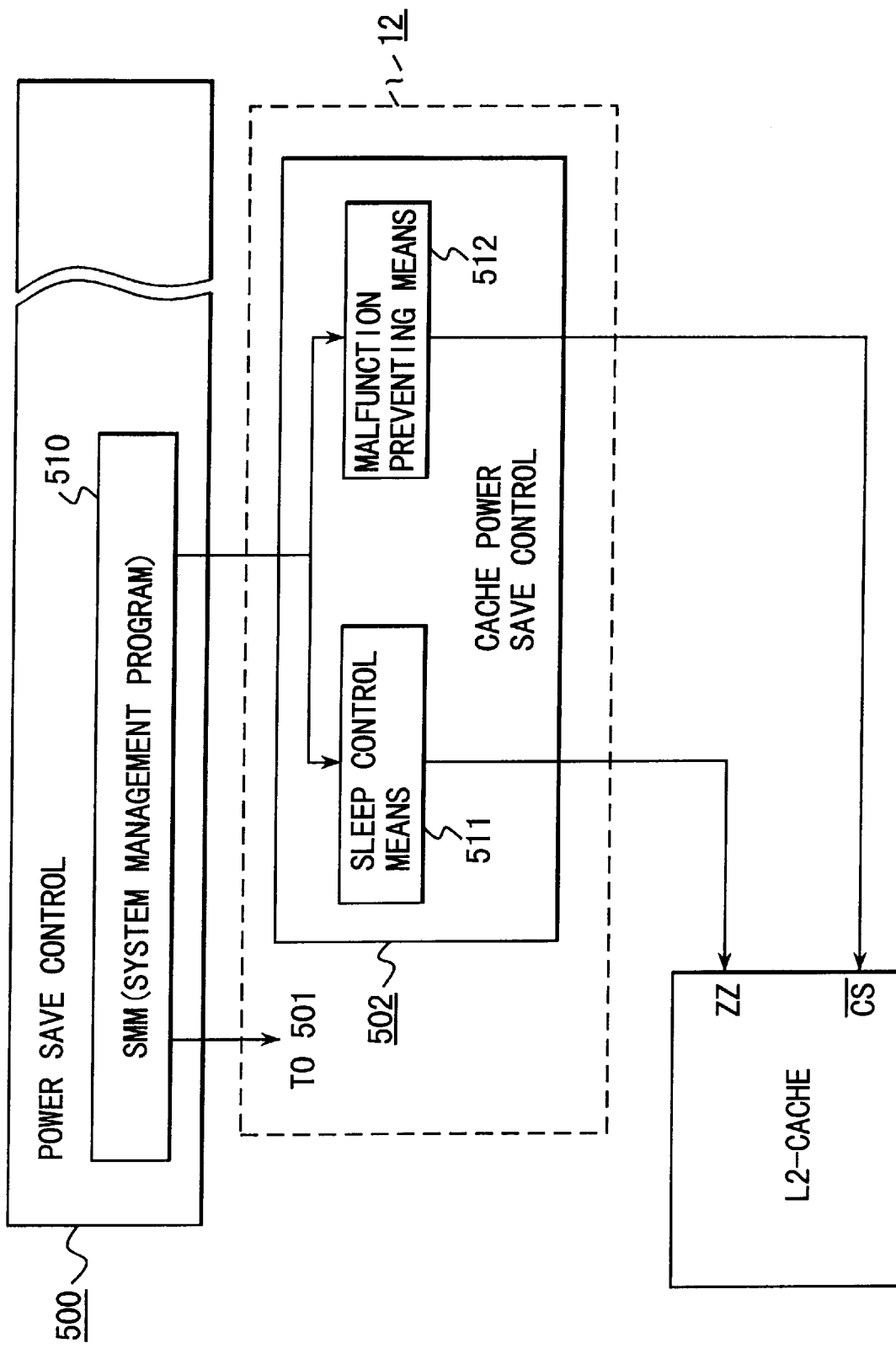
FIG. 3 is a schematic block diagram of a power saving control arrangement for the cache in the computer system according to the first embodiment.

The embodiment of the present invention will be described hereinafter with reference to the accompanying drawings.

Referring now to FIG. 1, there is illustrated a computer system according to a first embodiment of the invention, which is directed to a notebook or laptop personal computer that can be driven by a battery. On its system board are placed a CPU local bus (processor bus) 1, a PCI bus 2, an ISA bus 3, a CPU 11, a host/PCI bridging device 12, a main memory 13, a secondary cache (L2 cache) 14, PCI devices (I/O) 15 and 16 such as a graphics controller and a hard disk drive, a PCI/ISA bridging device 17, a BIOS ROM 18, and various ISA devices (I/O) 19.

The CPU 11 performs operation control and data processing in the whole system and has a cache (primary cache) built in. As the CPU 11 use is made of one that supports system management interrupts (SMI), for example, the Intel's microprocessor "Pentium". The system management facility using SMI is performed as follows.

That is, the CPU 11 has not only operation modes for executing programs, such as application programs, an operating system, etc., but also an operation mode for implementing the system management facility, which is referred to as the system management mode (SMM). The program executing operation modes include a real mode, a protect mode, and a virtual 86 mode.

The real mode is one that allows access to as much as 1 Mbytes of memory space. The logical to physical address translation is made by an address computation form that determines the physical address on the basis of an offset value from a base address represented by a segment register.

On the other hand, the protect mode is one that allows access to as much as 4 Gbytes of memory space. In this mode, linear addresses are determined by the use of an address mapping table called a descriptor table. The linear addresses are finally translated to the physical addresses by means of paging.

Thus, different memory addressing schemes are used in the protect mode and the real mode.

The system management mode (SMM) is a pseudo-real mode. The address computation form in this mode is the same as that in the real mode. Thus, no reference is made to the descriptor table and no paging is carried out.

When a system management interrupt (SMI) is generated to the CPU 11, the operation mode of the CPU is switched from the current mode that is the real mode, protect mode, or virtual 86 mode to the system management mode. When switching is made to the SMM by the SMI, the CPU 11 saves into an SRAM 131 the CPU status that is the contents of a CPU register at the time of switching. The SMRAM 131 is an overlay memory mapped into a section of the main memory 13, which can be accessed only in the SMM. When, in the SMM, a return instruction (RSM instruction) is executed, the CPU 11 restores the CPU status from the SMRAM 11 into the CPU register, returning to the operation mode prior to the SMI generation. In the SMM, a system management program stored in the BIOS ROM 18, such as an SMI handler, is executed.

The SMI is a type of non-maskable interrupt (NMI) but is higher in priority level than usual NMIs and maskable interrupts INTR, i.e., the top-priority interrupt. The generation of this SMI allows the system management program to be started independently of the currently-executed application program and operating system environment.

In this embodiment, the system management program is used to implement a power saving mode involving causing the CPU 11 to halt. That is, use is here made of a power saving routine in the system management program in order to implement power saving for the L2 cache 14 in conjunction with a CPU sleep mode in which the CPU 11 is halted at the time the system is idle. The CPU 11 is halted by the power saving routine causing the CPU 11 to execute a stop instruction (HALT). The power saving of the L2 cache 14 is attained by the power saving routine controlling the ZZ terminal of the L2 cache.

The ganged control of the power saving of the CPU 11 and the power saving of the L2 cache 14 features the present invention. The more specific arrangement and operation associated with that control will be described in connection with FIG. 2 and so on.

The host/PCI bridging device 12 is a bridge LSI that connects the processor bus 1 and the PCI bus 2 together in two directions, into which are incorporated a memory controller for controlling the main memory 13 and system logic for generation control of the SMI, NMI and INTR described above, a reset signal RESET, and a clock CLK.

An SMI is generated by the host/PCI bridging device 12 when the idle state of the computer system is detected, thereby executing the system management program. For example, the system idle state may be detected by monitoring interruption request signals from all devices within the system and determining that the system is idle when none of the interruption request signals are generated.

Also, a keyboard control routine in the BIOS can be used to perform the power saving control of the CPU 11. That is, when an application program enters in the wait state for key entry, an INT16H is called, so that a keyboard control routine is executed. When no interruption INTR caused by a keyboard entry occurs within a fixed time, the keyboard control routine detects that the system is in the idle state and then causes the CPU 11 to execute a HALT instruction to stop the program execution. The incorporation of a cache power saving process like the power saving routine in the system management program into this keyboard control routine allows the power saving control of the L2 cache 14 to be performed in conjunction with the CPU sleep.

When an interruption request signal is generated by any of devices under the control of the interruption controller installed in the host/PCI bridging device 12, an interruption INTR is generated so as to cause the CPU 11 to provide the corresponding interruption processing service.

The host/PCI bridging device 12 has a cache controller 121 for controlling the L2 cache 14 built in. The cache controller 121 is equipped with an L2 cache register R1 for controlling the operation of the L2 cache and a PBSRAM control register R2 into which chip select control information and power down control information are placed, respectively. The chip select control information controls the generation of a chip select signal ICS for the PBSRAM used as a data RAM of the L2 cache, and the power down control information controls the generation of a power-down signal to the ZZ terminal. The CPU 11 can make access to the L2 cache control register R1 and the PBSRAM control register R2. Thus, the CPU 11 can execute a cache invalidate cycle for invalidating the cache contents by writing a cache invalidate request into the L2 cache control register R1, cache enable/disable control by rewriting the chip select information in the PBSRAM control register R2, and power down control of the PBSRAM by rewriting the power-down control information in the PBSRAM control register R2.

The L2 cache 14 holds part of a copy of the main memory 13 and consists of a tag RAM and a data RAM. The write policy of the L2 cache is write through. The data RAM consists of a PBSRAM with the ZZ terminal. When the power-down signal to the ZZ terminal becomes active, the PBSRAM switches its operation mode from the normal operation mode to the low power dissipation mode referred to as the sleep mode (also referred to as snooze mode). In the sleep mode, all the input signals to the PBSRAM including a clock signal are blocked. Thus, the current dissipation can be checked to 2 mA at the most even in the state where the clock continues to be supplied. The sleep mode is a standby mode of low power dissipation. Even in this mode, data is retained without being lost. When the power-down signal becomes inactive, the operation mode is switched from the sleep mode back to the normal operation mode. Even if the operation mode is switched from the sleep mode to the normal operation mode, the PBSRAM cannot start the normal operation immediately. A delay time of the order of 100 ns is needed between the moment that the operation mode is switched back to the normal operation mode and the moment that the normal operation is ensured.

Referring now to FIG. 2 there is illustrated in block diagram form a power saving control system in the first embodiment.

As shown, the system is equipped with a CPU power saving control means 501 for controlling the power saving function of the CPU 11 and a cache power saving control means 502 for controlling the power saving function of the L2 cache (cache memory) 14. Here, the CPU power saving control means 501 and the cache power saving control means 502 are built in the host/PCI bridge 12.

The system is further equipped with a LCD power saving control means 503 for controlling the power saving function of an LCD (Liquid Crystal Display) 504 and an HDD power saving control means 505 for controlling the power saving function of an HDD (Hard Disk Drive) 506.

The power saving control means 500 controls the power saving functions respectively which are performed by the CPU power saving control means 501, the cache power saving control means 502, the LCD power saving control means 503, and the HDD power saving control means 505, respectively.

The power saving control means 500 is implemented, as shown in FIG. 3, by a system management mode (SMM) 510, which is implemented by execution of a system management program including an SMI handler.

As shown in FIG. 3, the cache power saving control means 502 consists of a sleep control means 511 and a malfunction preventing means 512.

The sleep control means 511 includes means for controlling the entry of a power-down signal ZZ to the L2 cache 14 in accordance with the sleep mode of the PBSRAM, and the malfunction preventing means 512 includes means for controlling the entry of a chip select signal (CS) to the L2 cache 14 in order to prevent the occurrence of malfunctions resulting from writing into or reading from the PBSRAM.

Next, reference will be made to FIGS. 4 and 5 to describe a first power saving control method for ganged control of the CPU power saving and the L2 cache power saving.

Figure 4:
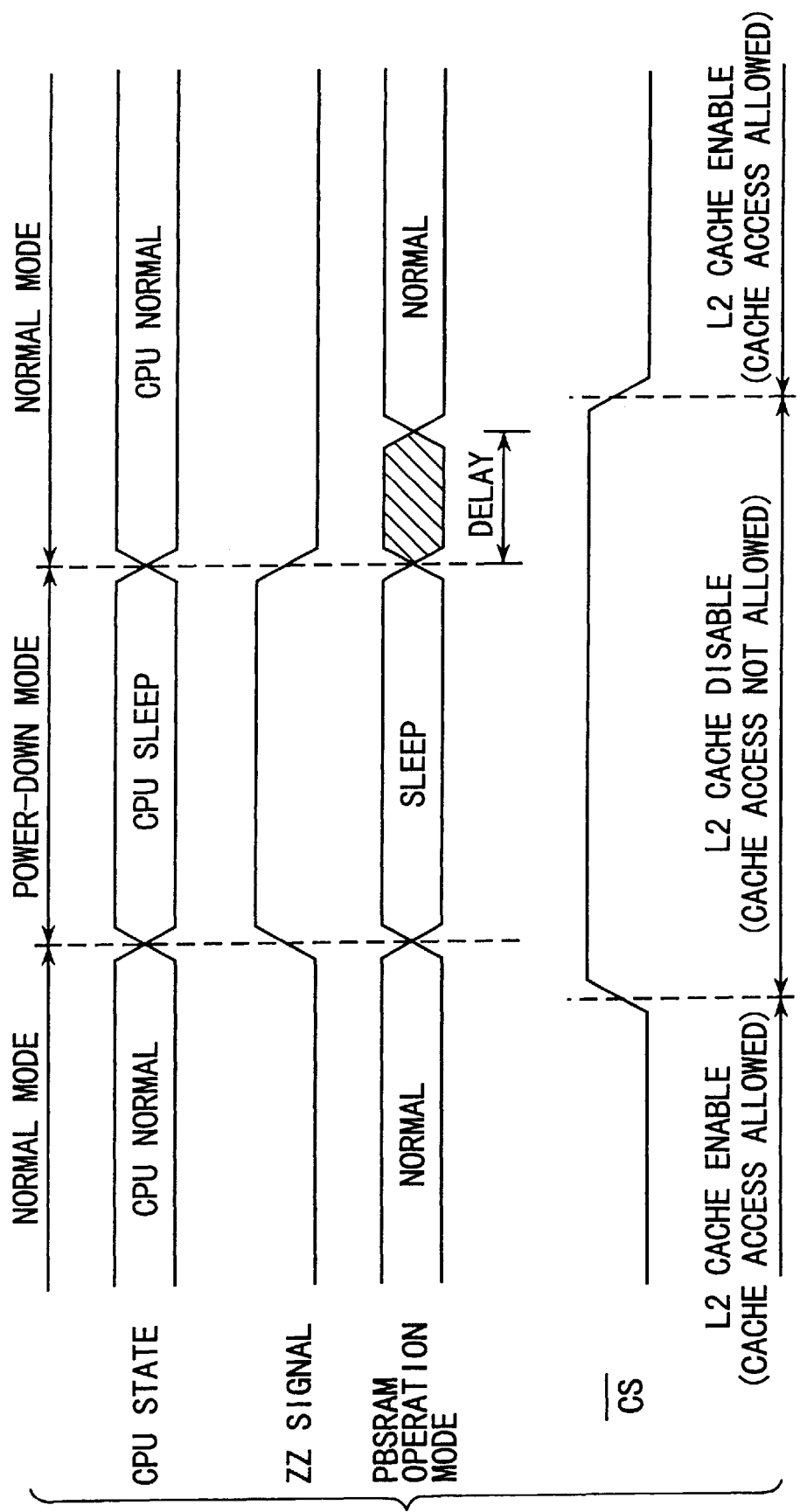
FIG. 4 is a timing diagram illustrating a relationship between operating states of the CPU and the operation modes of the PBSRAM when a first power saving control method is applied to the computer system of the first embodiment.
Figure 5:
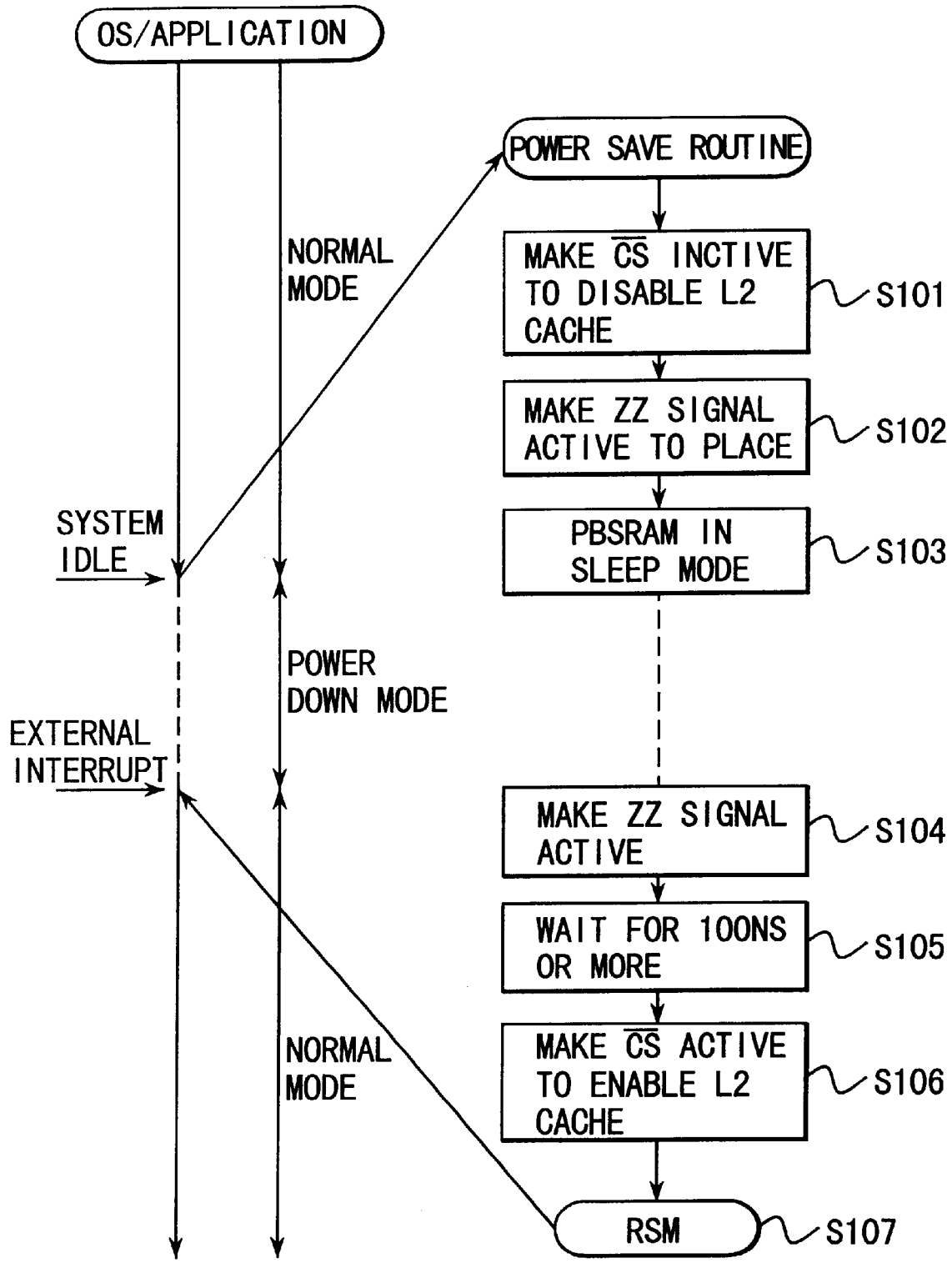
FIG. 5 is a flowchart for a BIOS power save routine for implementing the timing control shown in FIG. 4.

FIG. 4 shows the timing of operation control of the PBSRAM with respect to changes in CPU state.

When the occurrence of such a system idle state as the CPU 11 enters the wait state for an external interrupt is detected, a HALT instruction is executed, so that the CPU goes into the sleep mode of lower power dissipation than the normal mode. When an external interrupt IRQ, NMI, or SMI is generated or a reset signal RESET is input, the CPU 11 is freed from the sleep mode and returns to the normal mode.

At the same time a change occurs in the operating state of the CPU 11, the power down signal (ZZ signal) input to the ZZ terminal of the PBSRAM is controlled. That is, the power-down signal becomes active when the CPU 11 enters the sleep mode and inactive when the CPU leaves the sleep mode. Thereby, the PBSRAM can be placed in the low power dissipation mode in such a way as to coincide in time with the interval in which the CPU 11 is in the stopped state. Thus, the power saving of the CPU 11 and the L2 cache 14 can be achieved without affecting the performance of the computer system.

Before the power-down signal is made active, the chip select signal /CS is made inactive. Thereby, the L2 cache 14 becomes disabled, in which state no access is allowed. After a lapse of about 100 ns from when the power-down signal is made inactive and consequently the PBSRAM leaves the sleep mode, the chip select signal /CS is made active, whereby the cache 14 returns from the disabled state to the enabled state in which access is allowed. The enable and disable control of the L2 cache based on such a chip select signal /CS allows the cache memory to be made unavailable for a fixed period of time from when the PBSRAM of the L2 cache leaves the sleep mode. Therefore, even if a memory access request is made by the CPU 11 before the PBSRAM returns to the normal operating state, i.e., during about 100 nanoseconds from when the BPSRAM leaves the sleep mode, the occurrence of malfunctions resulting from writing into or reading from the PBSRAM can be prevented because the L2 cache is disabled during that period of time.

Next, reference will be made to FIG. 5 to describe the process flow of a power saving routine for performing the timing control of FIG. 4.

When the occurrence of the system idle state is detected, an SMI is generated to the CPU 11, so that the CPU enters the SMM to execute the power saving routine. In this routine, the PBSRAM chip select signal /CS is first made inactive by rewriting chip select information in the PBSRAM control register R2 of FIG. 1, placing the L2 cache 14 in the disabled state (step S101). The power saving routine next rewrites the power-down information in the PBSRAM control register R2 of FIG. 1 to make active the power-down control signal for the PBSRAM, thereby causing the PBSRAM to go into the sleep mode (step S102). After that, the power saving routine causes the CPU 11 to execute a HALT instruction (step S103). Then, the CPU 11 enters the sleep mode.

When an external interrupt occurs to the CPU 11 later, the CPU leaves the sleep mode and restarts run from the instruction following the HALT instruction in the power saving routine.

In this case, the power saving routine first makes inactive the power-down control signal for the PBSRAM by rewriting again the power-down control information in the PBSRAM control register R2, thereby switching the PBSRAM from the sleep mode to the normal mode (step S104). After that, the power saving routine waits for about 100 nanoseconds while executing, for example, an NOP instruction repeatedly (step S105) and then rewrites the chip select information in the PBSRAM control register R2 again to make the PBSRAM chip select signal /CS active, thereby causing the L2 cache 14 to return to the enabled state (step S106). A return instruction (RSM) is then executed to thereby return control to the program interrupted by the generation of the SMI (step S107).

The power saving routine may be incorporated into the INT16H keyboard control routine. In this case as well, the timing control of FIG. 4 can be exercised in the same way.

Next, reference will be made to FIGS. 6 and 7 to describe a second power saving control method for ganged control of the CPU power saving and the L2 cache power saving.

Figure 6:
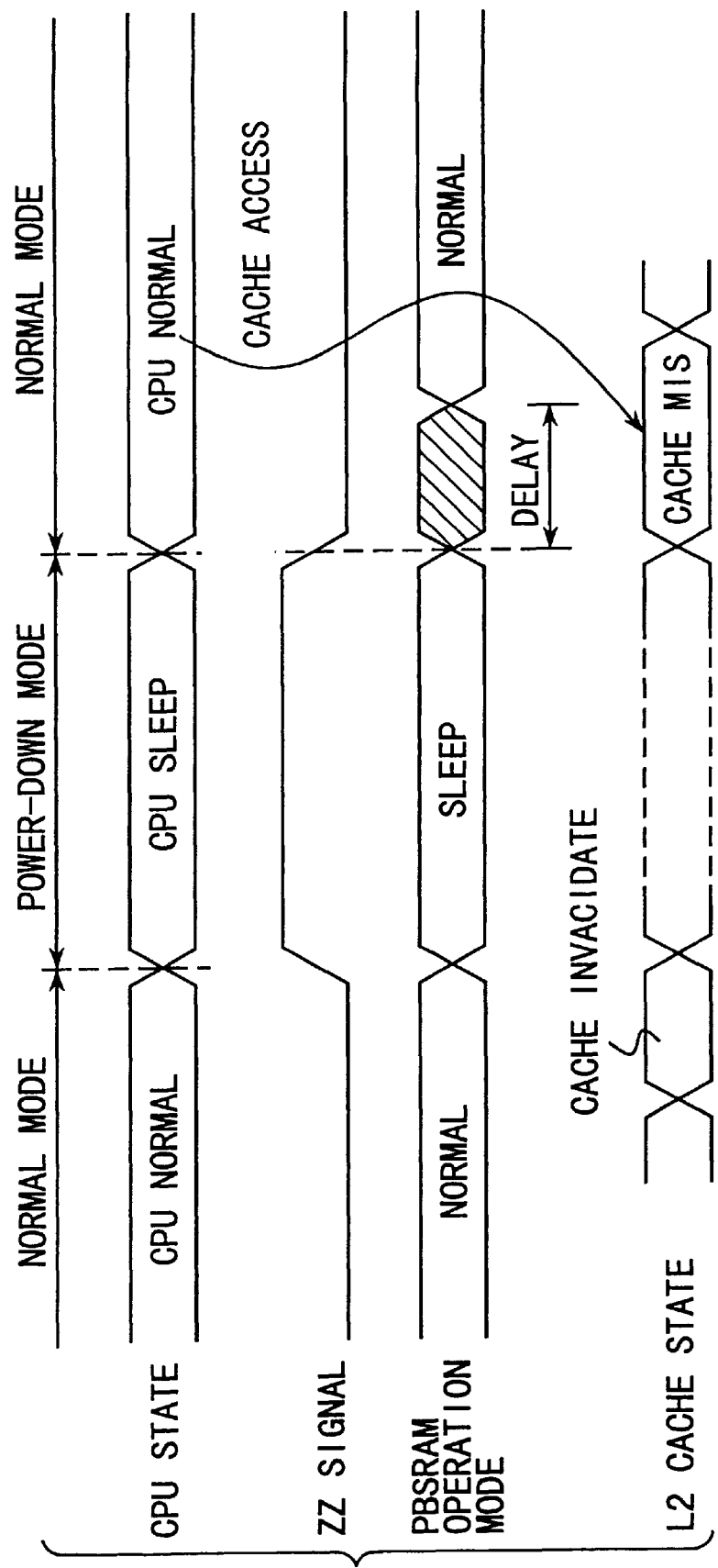
FIG. 6 is a timing diagram illustrating a relationship between operating states of the CPU and the operation modes of the PBSRAM when a second power saving control method is applied to the computer system of the first embodiment.

FIG. 6 shows the timing of operation control of the PBSRAM with respect to changes in CPU operating state.

FIG. 6 remains unchanged from FIG. 4 in that the power-down signal to the ZZ terminal of the PBSRAM is controlled synchronously with changes in the operating state of the CPU 11, thereby causing the PBSRAM to enter the sleep mode in such a way as to coincide in time with the CPU sleep interval. However, the cache disable/enable control based on the chip select signal is not performed here. Instead, a cache invalidate cycle to make the contents of the L2 cache 14 invalid is performed prior to the sleep mode of the PBSRAM.

Therefore, the cache has already become invalidated when the PBSRAM leaves the sleep mode. For this reason, the first access to the cache made after the CPU 11 has left the sleep mode never hit ("cache miss").

In the event of a cache miss, no reading from or writing into the PBSRAM is performed and a memory cycle for access to the main memory 13 is carried out. This memory cycle requires a relatively long time. No access to the cache occurs until the termination of the memory cycle. Thus, the PBSRAM can return to the normal operating state during that time, allowing the next access to the cache to be made to read from or write into the PBSRAM normally. Therefore, even if access to the cache is made immediately after the PBSRAM has left the sleep mode, a malfunction due to that access can be prevented.

Next, reference will be made to FIG. 7 to describe the process flow of a power saving routine for the timing control of FIG. 6.

When the occurrence of the system idle state is detected, an SMI is generated to the CPU 11, so that the CPU enters the SMM to execute the power saving routine. In this routine, first, cache invalidate instruction information is written into the L2 cache control register R1 of FIG. 1 to thereby cause the cache controller 121 to carry out an invalidate cycle, whereby the L2 cache 14 is made invalid (step S111). An invalid code is written into the tag RAM by this invalidate cycle.

Next, the power-down signal to the PBSRAM is made active by rewriting the power-down control information in the PBSRAM control register R2 of FIG. 1, thereby causing the PBSRAM to go into the sleep mode (step S112). After that, the power saving routine causes the CPU 11 to execute a HALT instruction (step S113). Then, the CPU 11 goes into the sleep mode.

When an external interruption is later generated to the CPU 11, the CPU leaves the sleep mode and restarts run from the instruction following the HALT instruction in the power saving routine.

In this case, the power saving routine first makes inactive the power-down control signal for the PBSRAM by rewriting again the power-down control information in the PBSRAM control register R2, thereby switching the PBSRAM from the sleep mode to the normal mode (step S114). After that, a return instruction (RSM) is executed to thereby return control to the program interrupted by the generation of the SMI (step S115).

The power saving routine may be incorporated into the INT16 keyboard control routine. In this case as well, the timing control of FIG. 6 can be exercised in the same way.

Next, reference will be made to FIGS. 8, 9 and 10 to describe a third power saving control method for ganged control of the CPU power saving and the L2 cache power saving.

In FIG. 8, there is illustrated a cache access command block circuit used with the third power saving control method. This command block circuit, indicated at 200, is incorporated into the host/PCI bridge 12 as a facility for preventing malfunctions due to access to the cache made immediately after the PBSRAM has left the sleep mode and blocks a memory access command input from the CPU 11 to the cache controller 121 for a fixed period of time from when the power-down signal is made inactive. The memory access command blocking is performed by blocking an address strobe signal /ADS to be sent from the CPU 11 to the cache controller 121.

The block circuit 200 is followed by the cache controller 121 and comprises an ADS latch circuit 201, a timer 202, and a gate circuit 203. The ADS latch circuit 201 consists of a shift register by way of example and latches an address strobe signal ADS from the CPU 11, the latched output being sent to the gate circuit 203. The timer 202 generates an ADS block signal for a fixed period of time (100 ns) from when the state of the power-down signal is changed from active to inactive. During the period of time the ADS block signal is generated, the gate circuit 203 disables the latched output of the ADS latch circuit 201, i.e., the latched address strobe signal /ADS, from being input to the cache controller 121. The latched address strobe signal /ADS is sent to the cache controller 121 after the ADS block signal is stopped. Thus, the cache controller 121 does not respond to a memory cycle on the processor bus 1 for a fixed period of time from when the state of the power-down signal is changed from active to inactive and, after the ADS block signal is stopped, responds to the memory cycle to start the cache control operation.

FIG. 9 shows the timing of operation control of the PBSRAM with respect to changes in CPU operating state.

FIG. 9 remains unchanged from FIGS. 4 and 6 in that the power-down signal to the ZZ terminal of the PBSRAM is controlled synchronously with changes in the operating state of the CPU 11, thereby causing the PBSRAM to sleep in such a way as to coincide in time with the CPU sleep interval. However, the cache disable/enable control based on the chip select signal and the cache invalidate cycle are not performed here. Instead, the block circuit 200 of FIG. 8 prevents malfunctions due to cache access made immediately after the PBSRAM leaves the sleep mode.

Next, reference will be made to FIG. 10 to describe the process flow of a power saving routine for the timing control of FIG. 9.

When the occurrence of the system idle state is detected, an SMI is generated to the CPU 11, so that the CPU enters the SMM to execute the power saving routine. In this routine, first, the power-down control information in the L2 cache control register R1 of FIG. 1 is rewritten to thereby make active the power-down control signal for the PBSRAM, whereby the PBSRAM goes into the sleep mode (step S121). After that, the power saving routine causes the CPU 11 to execute a HALT instruction (step S122). Then, the CPU 11 goes into the sleep mode.

When an external interruption is later generated to the CPU 11, the CPU leaves the sleep mode and restarts run from the instruction following the HALT instruction in the power saving routine.

In this case, the power saving routine first makes inactive the power-down control signal for the PBSRAM by rewriting again the power-down control information in the PBSRAM control register R2, thereby switching the PBSRAM from the sleep mode to the normal mode (step S123). In response to a change in the power-down control signal at that time, the block circuit 200 starts an operation of blocking a cache access command.

After that, a return instruction (RSM) is executed to thereby return control to the program interrupted by the generation of the SMI (step S115).

The power saving routine may be incorporated into the INT16H keyboard control routine. In this case as well, the timing control of FIG. 9 can be performed in the same way.

Hereinafter, a second embodiment of the present invention will be described.

Figure 11:
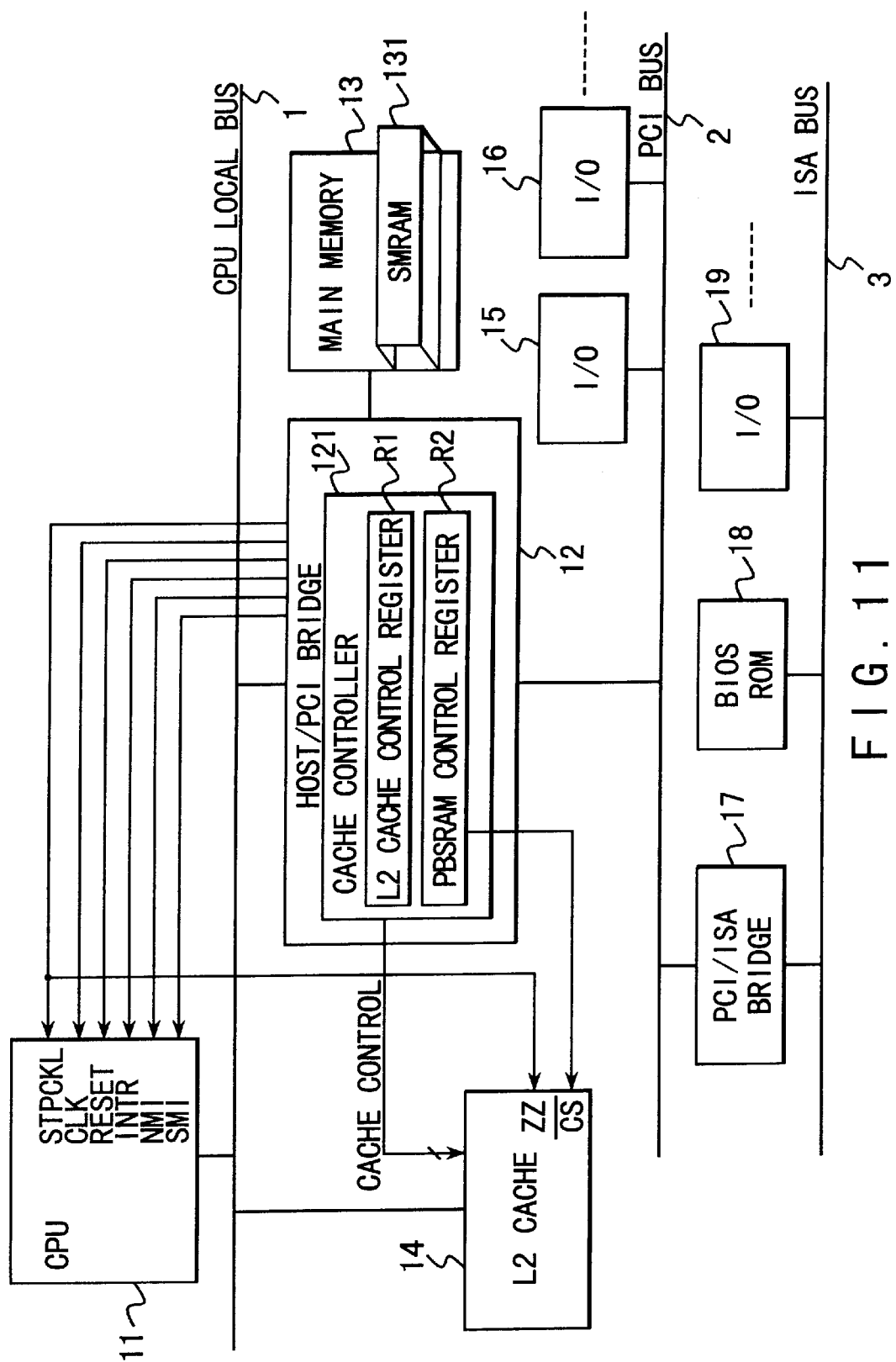
FIG. 11 is a block diagram of a computer system according to a second embodiment of the present invention.

In FIG. 11, there is shown a configuration of a computer system according to the second embodiment of the present invention.

In this computer system, a stop clock signal STPCLK is used to stop the operation of the CPU 11. When the stop clock signal STPCLK is made active, the CPU 11 leaves the normal mode and enters the low power dissipation mode to stop instruction execution. When the stop clock signal is made inactive, on the other hand, the CPU 11 returns to the normal mode.

That is, as shown in FIG. 12, the CPU 11 has three operating states that differ in power dissipation: normal state, stop grant state, and stop clock state. The normal state is the normal operating state of the CPU 11, in which instructions are executed. In the normal state, a maximum amount of power is dissipated and the current dissipation is of the order of 700 milliamperes. It is in the stop clock state that a minimum amount of power is dissipated. The current dissipation is of the order of 30 microamperes. In the stop clock state, not only instruction execution is stopped but also an external clock CLK and an internal clock CLK2 of the CPU 11 are stopped.

The stop grant state is an operating state between the normal state and the stop clock state, and the current dissipation is relatively low, of the order of 20 to 55 milliamperes. In this state, no instruction is executed. Both the external clock CLK and the internal clock CLK2 are in the running state, but the supply of the internal clock to the CPU core is prohibited. In the stop grant state, the external clock CLK can be placed in the stopped state. When the external clock is stopped, the CPU 11 is changed from the stop grant state to the stop clock state.

The transition between the normal state and the stop grant state can be made by the use of the stop clock signal STPCLK.

That is, when, in the normal state, the STPCLK signal to the CPU 11 is made active, the CPU 11 empties all of its internal pipelines after the completion of current instruction execution without execution of the next instruction and then executes a stop grant cycle, so that the state of the CPU is changed to normal to stop grant. When, in the stop grant state, the STPCLK signal is made inactive, the CPU 11 leaves the stop grant state and enters the normal state to restart execution of the next instruction.

As described above, the stop grant state is very low in power dissipation as compared with the normal state and has a feature that fast return can be made by the STPCLK signal to the normal state, i.e., the instruction running state. For this reason, with the system of FIG. 11, use is made of the stop grant state based on the stop clock signal STPCLK in order to implement the CPU sleep facility.

In the system of FIG. 11, the ZZ terminal of the PBSRAM used as the L2 cache 14 is electrically coupled to the stop clock input terminal of the CPU 11. As a result, the stop clock signal STPCLK is input to the ZZ terminal of the PBSRAM as its power-down signal. This allows the sleep control of the CPU 11 and the PBSRAM to be performed in a state where they are synchronized with each other.

Figure 13:
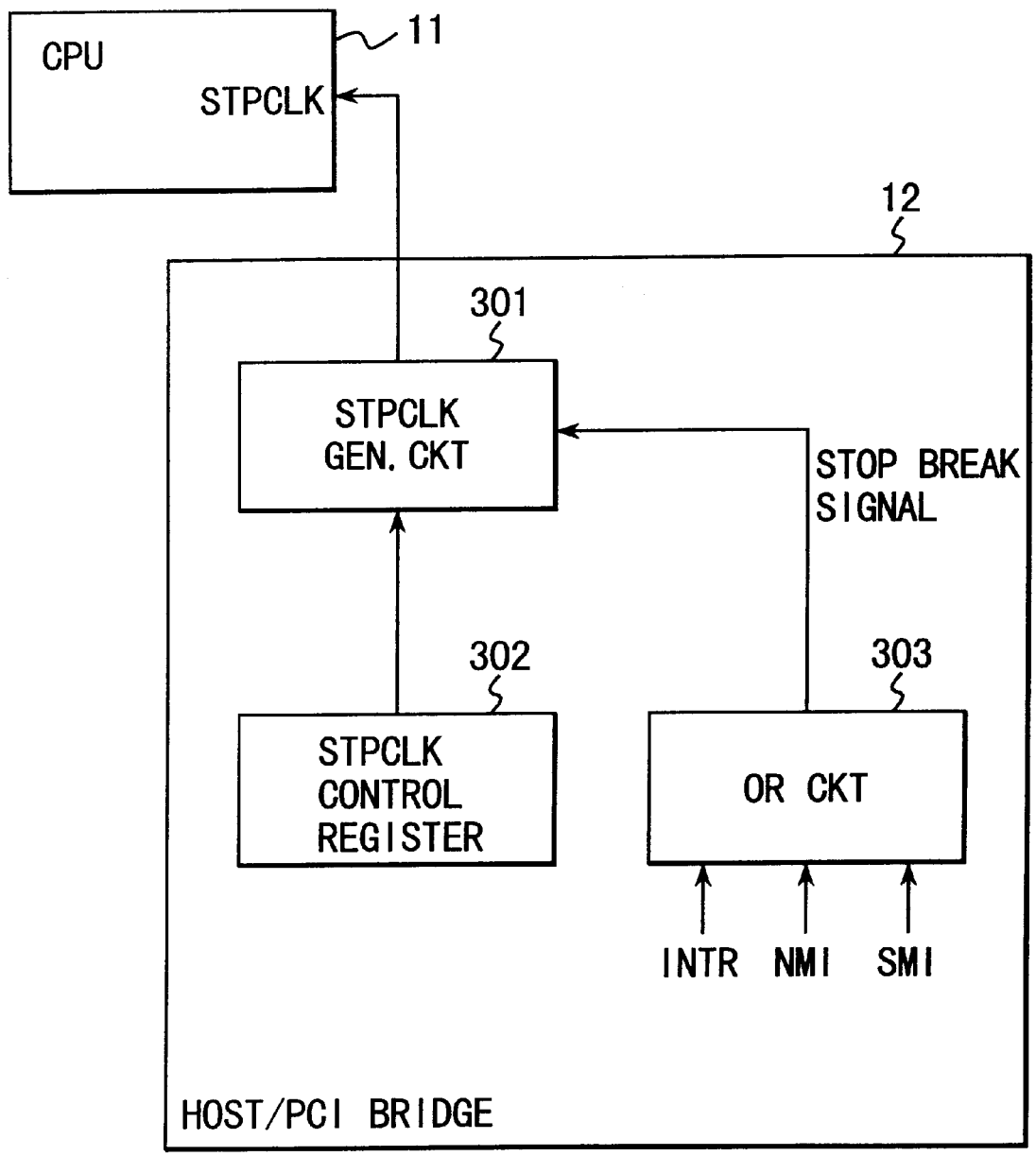
FIG. 13 is a block diagram of a stop clock signal generation control circuit used in the computer system of the second embodiment.

In FIG. 13, there is shown a hardware implementation of means for controlling the generation of a STPCLK signal in the host/PCI bridge 12.

The control of the generation of the STPCLK signal is performed by an STPCLK generator 301, an STPCLK control register 302, and an OR circuit 303. When STPCLK signal generation information is set in the STPCLK control register 302 by the CPU 11, the STPCLK signal is made active by the STPCLK generator 301. When any of external interruptions (INTR, NMI, SMI) occurs, it is sent from the OR circuit 303 to the STPCLK generator 301 as a stop break signal, which makes the STPCLK signal inactive.

Next, description will be given of a first power saving control method for ganged control of the CPU power saving and the L2 cache power saving in the system of FIG. 11.

The timing of operation control of the PBSRAM with respect to changes in the operating state of the CPU 11 remains unchanged from FIG. 4. As the malfunction preventing facility, use is made of cache enable/disable control based on a chip select signal.

The process flow of a power saving routine for this timing control is shown in FIG. 14.

When the occurrence of the system idle state is detected, an SMI is generated to the CPU 11, so that the CPU enters the SMM to execute the power saving routine. In this routine, the PBSRAM chip select signal /CS is first made inactive by rewriting chip select information in the PBSRAM control register R2 of FIG. 1, thereby placing the L2 cache 14 in the disabled state (step S131). The power saving routine next sets STPCLK signal generation information in the STPCLK control register 302 of FIG. 13 to thereby generate an STPCLK signal (step S132). At this point, the power-down control signal for the PBSRAM is made active simultaneously, so that the CPU 11 and the PBSRAM enter the sleep mode.

When an external interrupt occurs to the CPU 11 later, the STPCLK signal becomes inactive, so that the CPU leaves the sleep mode and restarts run from the next instruction in the power saving routine. At this point, the PBSRAM power-down signal is made inactive simultaneously, so that the CPU 11 and the PBSRAM leaves the sleep mode.

The power saving routine waits for about 100 nanoseconds while executing, for example, an NOP instruction repeatedly (step S133) and then rewrites the chip select information in the PBSRAM control register R2 again to make the PBSRAM chip select signal /CS active, thereby making the PBSRAM chip select signal /CS active to return the L2 cache 14 to the enabled state (step S134). A return instruction (RSM) is then executed to thereby return control to the program interrupted by the generation of the SMI.

The power saving routine may be incorporated into the INT16H keyboard control routine.

Next, description will be given of a second power saving control method for ganged control of the CPU power saving and the L2 cache power saving in the system of FIG. 11.

The timing of operation control of the PBSRAM with respect to changes in the operating state of the CPU 11 remains unchanged from FIG. 6. As the malfunction preventing facility, use is made of cache invalidate control.

Figure 15:
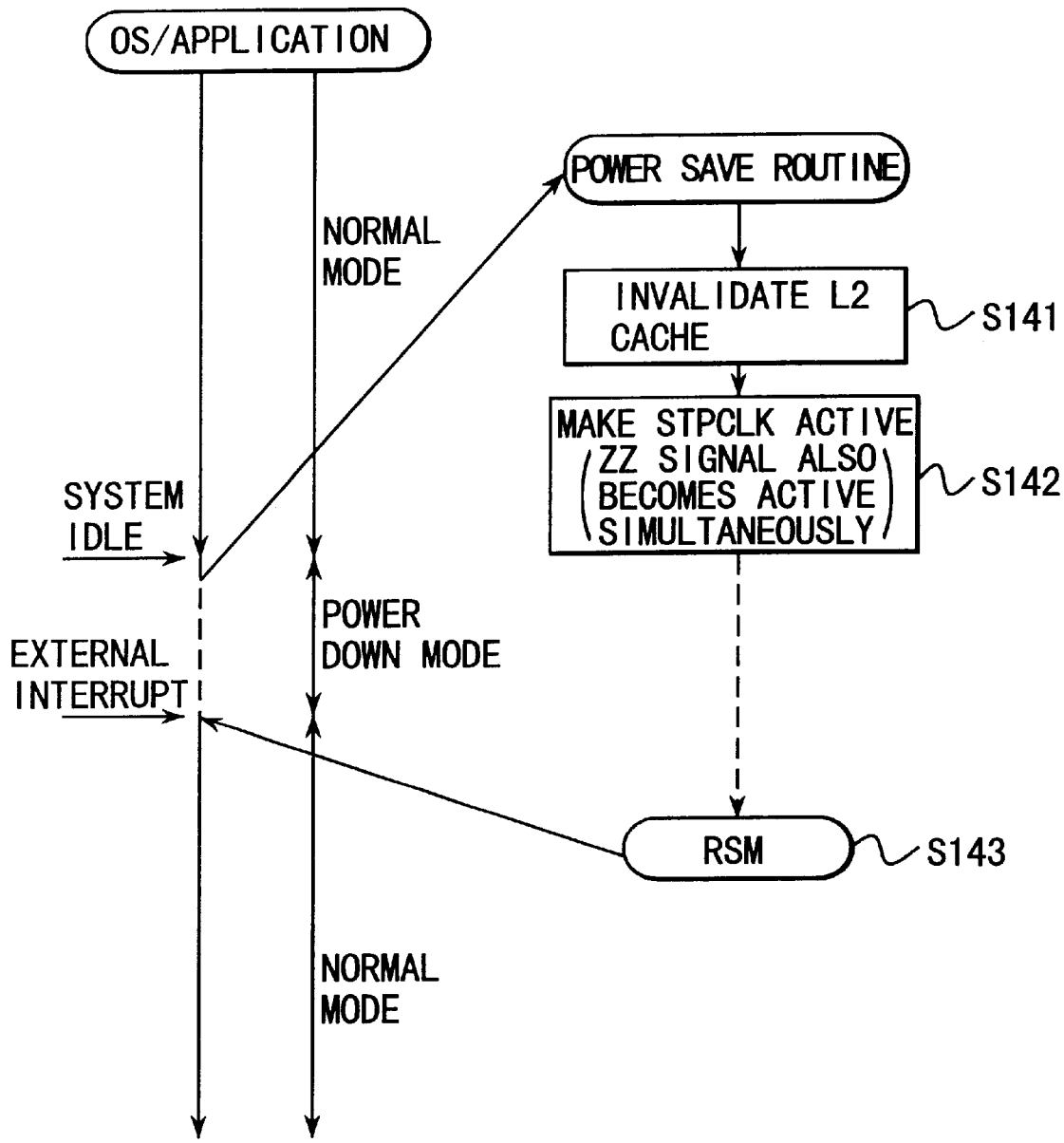
FIG. 15 is a flowchart for a BIOS power saving routine for implementing a second power saving method applied to the computer system of the second embodiment.

The process flow of a power saving routine for this timing control is shown in FIG. 15.

When the occurrence of the system idle state is detected, an SMI is generated to the CPU 11, so that the CPU enters the SMM to execute the power saving routine. In this routine, first, cache invalidate instruction information is written into the L2 cache control register R1 of FIG. 1 to thereby cause the cache controller 121 to carry out an invalidate cycle for invalidating the cache memory 14 (step S141). The invalidate cycle allows an invalid code to be written into the tag RAM.

The power saving routine next sets STPCLK signal generation information in the STPCLK control register 302 of FIG. 13 to thereby generate an STPCLK signal (step S142). At this point, the power-down control signal for the PBSRAM is made active simultaneously, so that the CPU 11 and the PBSRAM enter the sleep mode.

When an external interrupt occurs to the CPU 11 later, the STPCLK signal becomes inactive, so that the CPU leaves the sleep mode and restarts run from the next instruction in the power saving routine. At this point, the PBSRAM power-down signal is made inactive simultaneously, so that the CPU 11 and the PBSRAM leaves the sleep mode.

A return instruction (RSM) is executed to thereby return control to the program interrupted by the generation of the SMI (step S143).

The power saving routine may be incorporated into the INT16H keyboard control routine.

Figure 16:
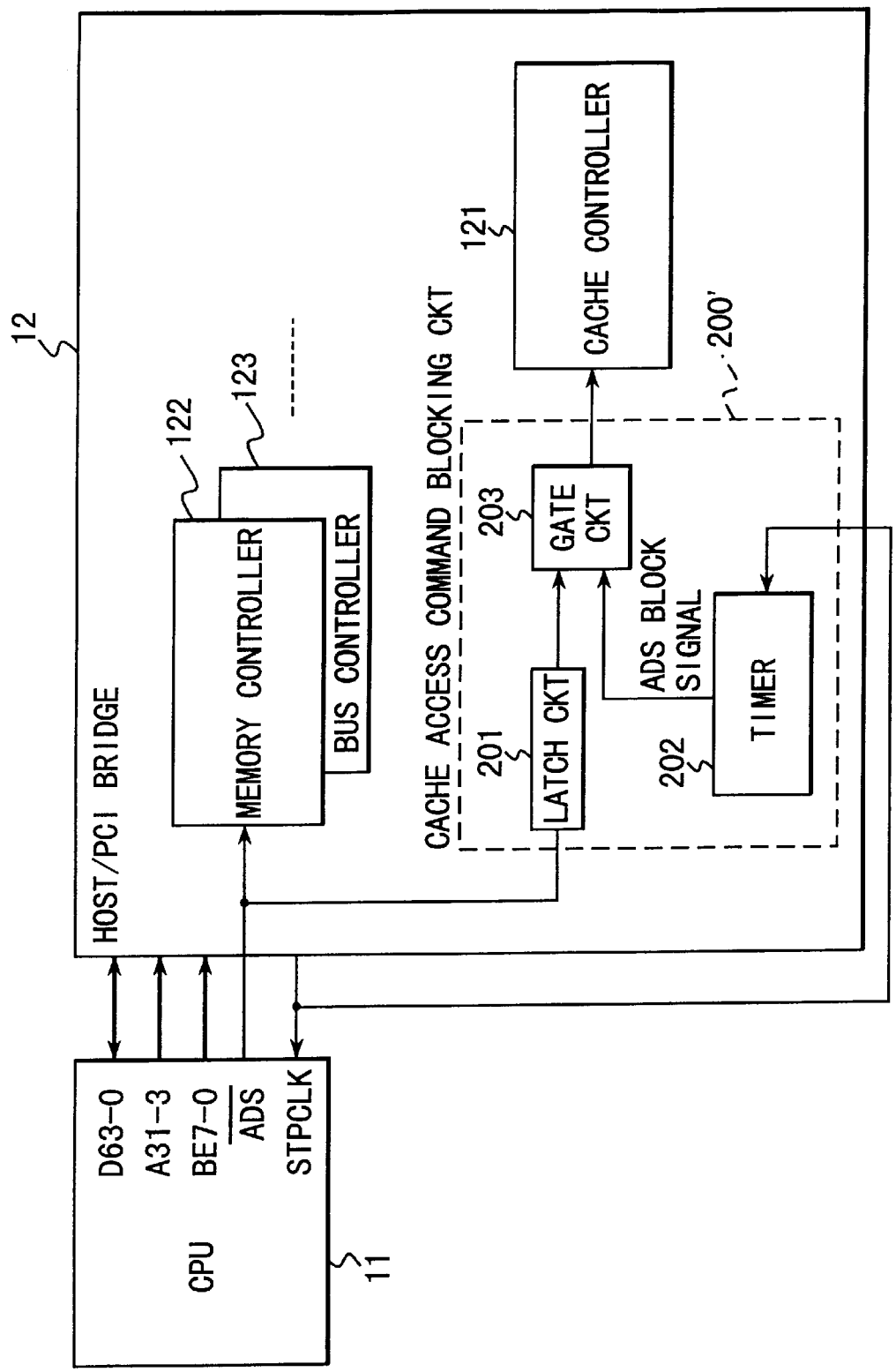
FIG. 16 is a block diagram of a cache access command block circuit used when a third power saving control method is applied to the computer system of the second embodiment.
Figure 17:
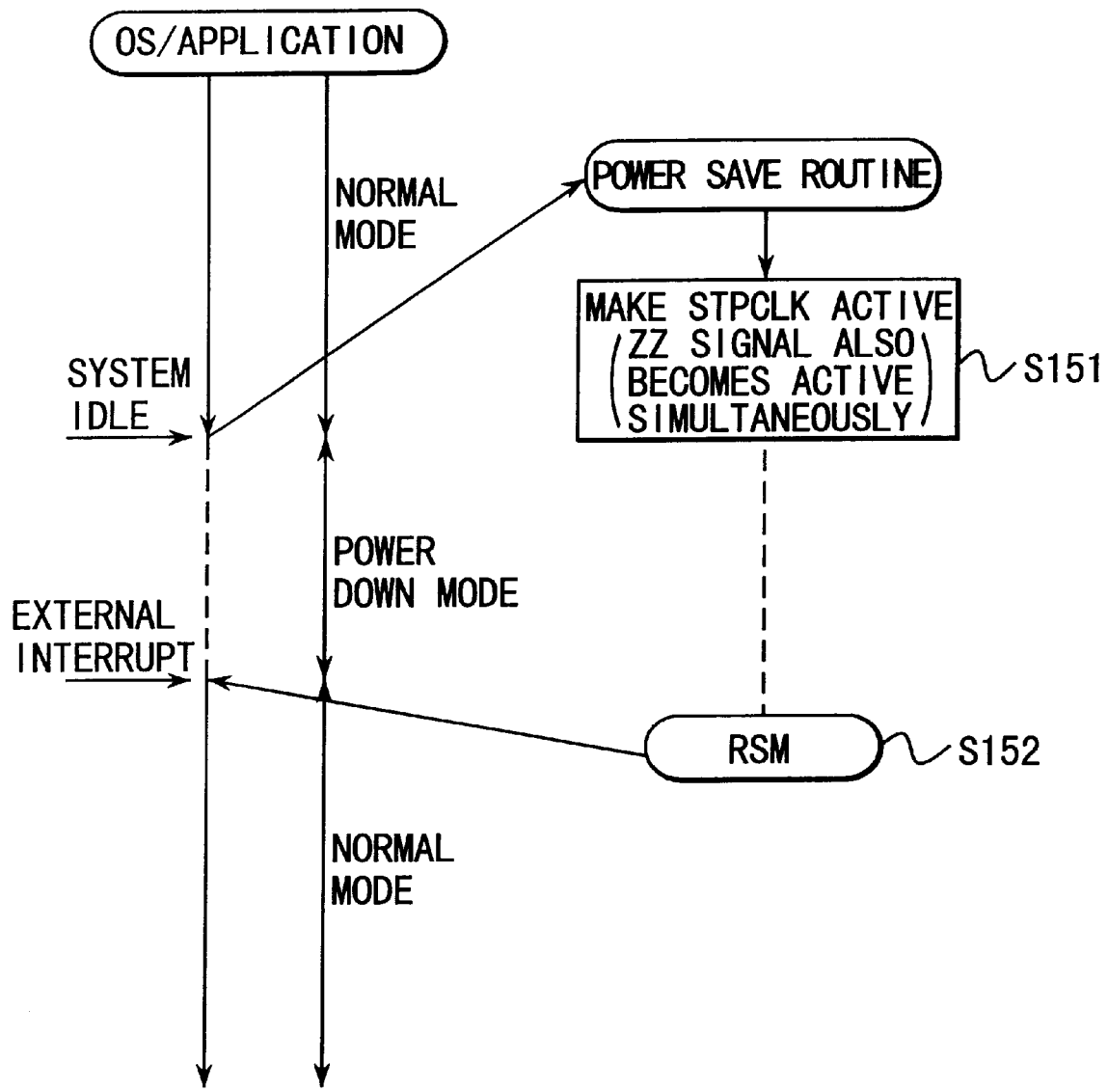
FIG. 17 is a flowchart for a BIOS power saving routine for implementing a third power saving method applied to the computer system of the second embodiment.

Next, description will be given of a third power saving control method for ganged control of the CPU power saving and the L2 cache power saving in the system of FIG. 16.

The timing of operation control of the PBSRAM with respect to changes in the operating state of the CPU 11 remains unchanged from FIG. 9. As the malfunction preventing facility, use is made of a cache access command block circuit 200' of FIG. 16. The cache access command block circuit of FIG. 16 is distinct from that of FIG. 8 only in that a signal input to the timer 202 is the STPCLK signal (as opposed to the power-down signal). That is, the timer 202 generates an ADS block signal for a fixed period of time (100 ns) from when the state of the STPCLK signal is changed from active to inactive. During the duration of the ADS block signal, the gate circuit 203 disables the latched output of the ADS latch circuit 201, i.e., the latched address strobe signal /ADS from being input to the cache controller 121. After the ADS block signal is stopped, the latched address strobe signal /ADS is sent to the cache memory controller 121. Thus, the cache memory controller 121 does not respond to a memory cycle of the CPU 11 during a fixed period of time from when the state of the STPCLK signal is changed from active to inactive and, after the ADS block signal is stopped, responds to the memory cycle to start the cache control operation.

When the occurrence of the system idle state is detected, an SMI is generated to the CPU 11, so that the CPU enters the SMM to execute the power saving routine. The power saving routine next sets STPCLK signal generation information in the STPCLK control register 302 of FIG. 13 to thereby generate an STPCLK signal (step S151). At this point, the power-down control signal for the PBSRAM is made active simultaneously, so that the CPU 11 and the PBSRAM enter the sleep mode.

When an external interrupt occurs to the CPU 11 later, the STPCLK signal becomes inactive, so that the CPU leaves the sleep mode and restarts run from the next instruction in the power saving routine. At this point, the PBSRAM power-down signal is made inactive simultaneously, so that the CPU 11 and the PBSRAM leaves the sleep mode. In response to a change in the STPCLK signal, the block circuit 200' starts an operation of blocking a cache access command.

A return instruction (RSM) is then executed to thereby return control to the program interrupted by the generation of the SMI (S152).

The power saving routine may be incorporated into the INT16H keyboard control routine.

A personal computer which is the third embodiment of the invention will be described, with reference to FIGS. 18 to 20. In this personal computer, a CE (Cache Enable/disable) signal controls the L2 cache memory, thereby to save power in the L2 cache memory.

Figure 18:
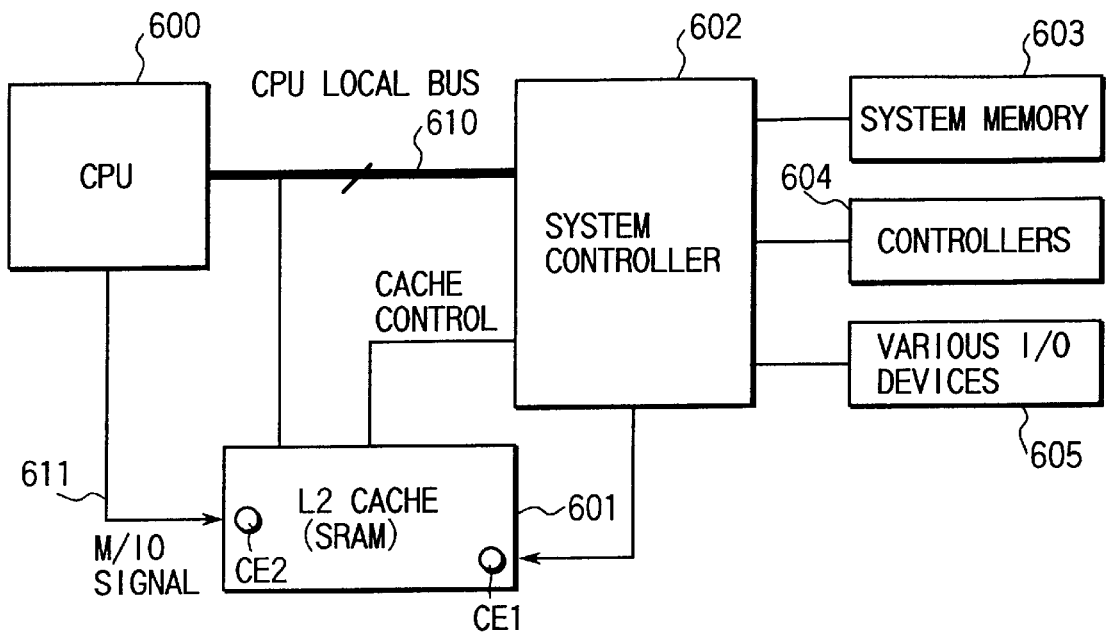
FIG. 18 is a block diagram showing the personal computer according to a third embodiment of the present invention.

FIG. 18 is a block diagram showing the personal computer. As shown in FIG. 18, a CPU 600 is connected to a system controller 602 by a CPU local bus 610. Connected to the bus 610 is an L2 cache memory 601. The L2 cache memory 601 is controlled by the cache controller incorporated in the system controller 602. As described above, the L2 cache memory 601 is a high-speed SRAM suitable for use as a secondary cache memory. It is, for example, TC55V1325 (manufactured by Toshiba) which is a pipeline burst SRAM having low power-consumption mode.

Various components are connected to the system controller 602. Among them are: a system memory 603, controllers 604, and various I/O devices 605. The system memory is, for example, a DRAM. The I/O devices 605 are a monitor, a keyboard, an FDD (Floppy Disk Drive), and the like.

The CPU 600 and the L2 cache memory 601 are connected not only by the CPU local bus 610, but also by a signal line 611. More precisely, the line 611 connects the M/IO signal output terminal of the CPU 600 to the CE signal input terminal of the L2 cache memory 601.

The M/IO signal output from the CPU 600 is at high level while the CPU 600 is operating in a memory cycle, and at low level while the CPU 600 is operating in an I/O cycle. The L2 cache memory 601 is enabled when the CE signal input to the memory 601 is set at high level, and is disabled when the CE signal is set at low level.

FIG. 19 is a table which shows the DC characteristics of TC55V1325 mentioned above. As seen from FIG. 19, the static power consumption $I_{DDS1}$ is 35 mA or 45 mA at most while this SRAM is disabled or operating in the low power-consumption mode. Obviously, power can be more saved than while the TC55V1325 is enabled or operating in normal power-consumption mode.

As long as the CPU 600 operates in an I/O cycle, the system controller 602 cannot control the L2 cache memory 601. In other words, the L2 cache memory 601 remains unused during the I/O cycle.

Figure 20:
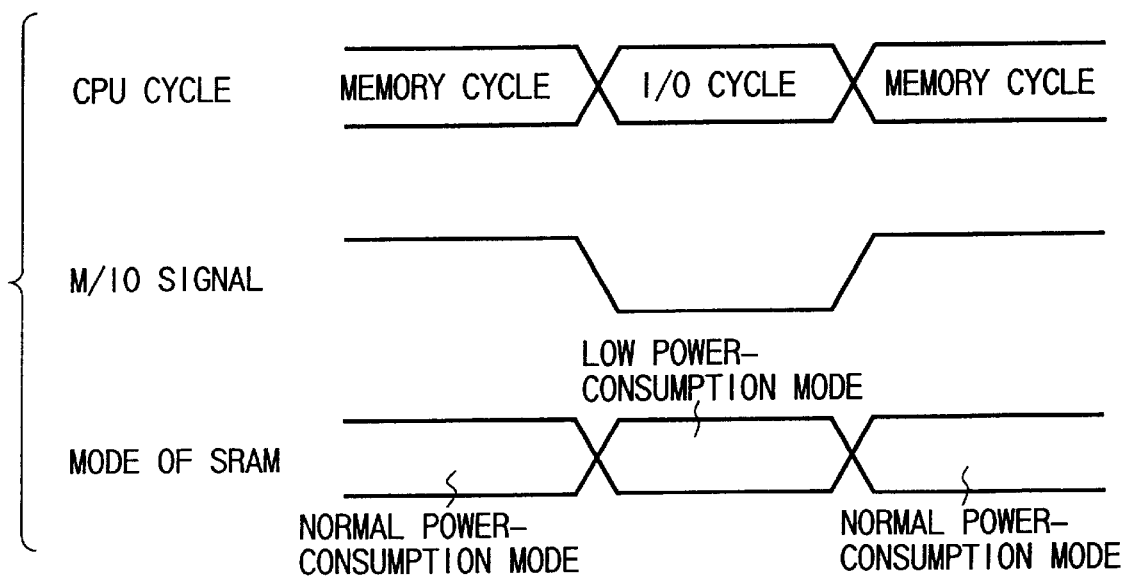
FIG. 20 is a timing chart of the M/IO signal of the third embodiment.

FIG. 20 is a timing chart of the M/IO signal. As FIG. 20 shows, the M/IO signal is at high level while the CPU 600 is operating in a memory cycle. As long as the M/IO signal remain at high level, the L2 cache memory 601 is enabled and set in the normal power-consumption mode. That is, the memory 601 consumes power at normal rate. While the CPU 600 is operating in an I/O cycle, the M/IO signal is at low level. As long as the M/IO signal stays at low level, the L2 cache memory 601 is disabled and set in the low power-consumption mode.

Thus, in the third embodiment it is possible to save power in the L2 cache memory 601 while the CPU 600 is operating in the normal mode, not the above-mentioned sleep mode or suspend mode. The third embodiment can be combined with either the first embodiment or the second embodiment.

As described above, according to the present invention, there is provided a computer system which provides high performance, low power dissipation and high reliability by implementing an effective power saving function utilizing the lower power dissipation mode of a secondary cache and a power saving control method for the computer system.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents.

I claim:

1. A computer system comprising:
   a CPU which has a normal operation mode and a power saving mode that is lower in power dissipation than the normal operation mode:
   a cache memory which has a normal operation mode and a power saving mode that is lower in power dissipation than the normal operation mode;
   switch means for switching the cache memory between the normal operation mode and the power saving mode according to a switching between the normal operation mode and the power saving mode of the CPU; and
   cache invalidation means for invalidating the cache memory during a lapse of a predetermined period of time from when the cache memory is switched to the normal operation mode from the power saving mode by the switch means.

2. The computer system according to claim 1, further comprising:
   a cache disable means for, when the operation mode of the cache memory is switched to the low power dissipation mode, setting the cache memory to the disabled state prior to the mode switching; and
   a cache enable means for switching the cache memory from the disabled state to an enabled state after said lapse of the predetermined period of time.

3. The computer system according to claim 2, wherein:
   said cache disable means sets said cache memory to a disabled state by making inactive a chip select signal to be applied to said cache memory; and
   said cache enable means sets said cache memory from a disabled state to an enabled state by changing a state of said chip select signal from inactive to active.

4. The computer system according to claim 1, wherein said cache invalidation means invalidates a contents of said cache memory when the cache memory is switched to the low power dissipation mode so that a cache miss takes place in cache access made during said predetermined period of time.

5. The computer system according to claim 1, wherein said cache invalidation means comprises block means for blocking an entry of a memory access command from the CPU to a cache controller until said predetermined period of time elapses from when a power-down signal is changed to switch said operation mode of the cache memory from the low power dissipation mode to the normal operation mode.

6. A computer system according to claim 1, further comprises means for, at a time a system is in idle state, generating a stop clock signal to set said CPU to the low power dissipation mode and, at a time of occurrence of a system event, stopping the generation of the stop clock signal to return said CPU from the low power dissipation mode to the normal operation mode, and wherein:
   said CPU comprises a stop clock input terminal connected to receive a stop clock signal and responsive to the stop clock signal to switch its operation mode between a normal operation mode and a low power dissipation mode in which clock supply to its core unit is stopped, and
   said cache memory comprises a power-down input terminal connected to receive a power-down signal and responsive to the power-down signal to switch its operation mode between a normal operation mode and a low power dissipation mode, and
   said power-down input terminal of said cache memory being electrically coupled to the stop clock input terminal of said CPU to thereby allow the operation mode of said cache memory to be switched between the normal operation mode and the low power dissipation mode in conjunction with the operation mode switching in said CPU.

7. The computer system according to claim 6, further comprising:
   a register in which chip select control information is set for controlling a generation of a chip select signal to be applied to said cache memory; and
   means for, by rewriting said chip select control information in said register under software control, making inactive the chip select signal to said cache memory to set the cache memory to disabled state when said CPU enters the low power dissipation mode and, after a lapse of a predetermined period of time from when said CPU is switched to the normal operation mode, switching the chip select signal from inactive state to active state to switch said cache memory to enabled state.

8. For use with a computer system equipped with a cache memory having a power-down input terminal connected to receive a power-down signal and responsive to the power-down signal to switch its operation mode between a normal operation mode and a low power dissipation mode, a power-down control method for said cache memory comprising the steps of:
   setting the cache memory to disabled state when the operation mode of the cache memory is switched to the low power dissipation mode;
   invalidating the cache memory during a lapse of a predetermined period of time from when the operation mode of the cache memory is switched from the low power dissipation mode to the normal operation mode; and switching the operation mode of the cache memory from the disabled state to enabled state after the invalidation of the cache memory.

9. The method according to claim 8, further comprising the step of invalidating the contents of the cache memory when the cache memory is switched to the low power dissipation mode so that a cache miss takes place in cache access made during said predetermined period of time.

10. A cache memory control method for a computer system having a CPU of which an operation is stopped at a time the system is in idle state, and is restarted at a time of occurrence of a system event, a cache memory having its operation mode switched between a normal operation mode and a low power dissipation mode, a first register in which power-down control information is set for controlling a generation of said power-down signal, and a second register in which chip select control information is set for controlling a generation of a chip select signal to be applied to said cache memory, comprising the steps of:

setting said cache memory from an enabled state to a disabled state by rewriting said chip select control information in said second register, upon detecting said system idle state;

switching the operation mode of the cache memory to the low power dissipation mode by rewriting said power-down control information in said first register;

stopping the operation of said CPU;

switching the operation mode of said cache memory from the low power dissipation mode to the normal operation mode by rewriting said power-down control information in said first register when the operation of said CPU is started by the occurrence of the system event;

invalidating the cache memory during a lapse of a predetermined period of time from when the operation mode of the cache memory is switched from the low power dissipation mode to the normal operation mode; and setting said cache memory from the disabled state to the enabled state by rewriting said chip select control information in said second register after the invalidation of the cache memory.

11. A cache memory control method for a computer system having a CPU of which an operation is stopped at a time the system is in idle state, and is restarted at a time of occurrence of a system event, a cache memory having its operation mode switched between a normal operation mode and a low power dissipation mode, a cache controller for controlling said cache memory, and a register in which power-down control information is set for controlling a generation of a power-down signal to be applied for said cache memory, comprising the steps of:

executing invalidate cycle to invalidate the contents of said cache memory by said cache controller upon detecting the system idle state;

switching the operation mode of the cache memory to the low power dissipation mode by rewriting said power-down control information in said register;

stopping the operation of said CPU; and switching the operation mode of said cache memory from the low power dissipation mode to the normal operation mode by rewriting the power-down control information at said register when the operation of said CPU is started by the occurrence of the system event.

12. A cache memory control method for computer system having a CPU of which an operation is stopped at a time the system is in idle state and is restarted at a time of occurrence of a system event a cache memory having its operation mode switched between a normal operation mode and a low power dissipation mode, a cache controller for controlling said cache memory, a register in which power-down control information is set for controlling a generation of a power-down signal applied to be said cache memory, and a block circuit responsive to the power-down signal for blocking the entry of a memory access command from said CPU to said cache controller, comprising the steps of:

switching the operation mode of the cache memory to the low power dissipation mode by rewriting said power-down control information in said register upon detecting the system idle state;

stopping the operation of said CPU;

switching the operation mode of said cache memory from the low power dissipation mode to the normal operation mode by rewriting the power-down control information said register when the operation of said CPU is started by the occurrence of the system event; and blocking the entry of a memory access command from said CPU to said cache controller until a predetermined period of time elapses from when the state of the power-down signal is changed to switch the operation mode of the cache memory from the low power dissipation mode to the normal operation mode.

13. A computer system comprising:

a main memory;

I/O devices;

a CPU for outputting an M/IO signal which represents a first operation cycle while the CPU is accessing the main memory and a second operation cycle while the CPU is accessing I/O devices; and a cache memory which is operated in a normal power-consumption mode when the M/IO signal represents the first operation cycle and in a low power-consumption mode when the M/IO signal represents the second operation cycle.

14. The computer system of claim 13, further comprising:

system controller outputting a predetermined signal; and calculate means for calculating logical AND of said predetermined signal and said M/IO signal.

15. The computer system of claim 13, wherein said M/IO signal of the CPU is connected to a chip enable/disable terminal of the cache memory.

* * * * *